US 9,094,481 B2

(12) United States Patent
Srinivasan et al.

(10) Patent No.: US 9,094,481 B2
(45) Date of Patent: Jul. 28, 2015

(54) ADAPTIVE DOWNLOADING OR STREAMING TO CONSERVE MOBILE DEVICE OR NETWORK RESOURCES

(71) Applicant: Seven Networks, Inc., San Carlos, CA (US)

(72) Inventors: Suresh Srinivasan, Hillsboro, OR (US); Yuan Kang Lee, San Diego, CA (US); Chaitali Sengupta, Richardson, TX (US)

(73) Assignee: Seven Networks, Inc., San Carlos, CA (US)

( * ) Notice: Subject to any disclaimer, the term of this patent is extended or adjusted under 35 U.S.C. 154(b) by 0 days.

(21) Appl. No.: 14/253,574

(22) Filed: Apr. 15, 2014

(65) Prior Publication Data
US 2014/0310386 A1 Oct. 16, 2014

Related U.S. Application Data

(60) Provisional application No. 61/812,018, filed on Apr. 15, 2013.

(51) Int. Cl.
G06F 15/173 (2006.01)
H04L 29/06 (2006.01)

(52) U.S. Cl.
CPC ............... *H04L 65/605* (2013.01); *Y02B 60/50* (2013.01)

(58) Field of Classification Search
None
See application file for complete search history.

(56) References Cited

U.S. PATENT DOCUMENTS

| 7,188,214 | B1 | 3/2007 | Kasriel et al. |
| 7,443,321 | B1 | 10/2008 | Kaufman et al. |
| 7,920,590 | B2 | 4/2011 | Le et al. |
| 7,953,934 | B2 | 5/2011 | Thomas et al. |
| 8,068,478 | B2 | 11/2011 | Cruz |
| 2002/0023145 | A1* | 2/2002 | Orr et al. ............... 709/219 |
| 2002/0191596 | A1 | 12/2002 | Moyano et al. |
| 2005/0120181 | A1 | 6/2005 | Arunagirinathan et al. |
| 2005/0185677 | A1 | 8/2005 | Christoffersson |
| 2007/0171907 | A1 | 7/2007 | Mansutti |
| 2008/0320155 | A1* | 12/2008 | Ganapathy et al. ........... 709/230 |
| 2010/0106770 | A1* | 4/2010 | Taylor et al. ................ 709/203 |
| 2010/0228875 | A1* | 9/2010 | Myers ........................ 709/231 |
| 2012/0079059 | A1 | 3/2012 | Fonseca, Jr. |
| 2012/0259945 | A1 | 10/2012 | Gupta et al. |
| 2013/0054728 | A1 | 2/2013 | Amir et al. |
| 2013/0091248 | A1 | 4/2013 | Viswanathan et al. |

FOREIGN PATENT DOCUMENTS

WO 2011115965 A1 9/2011

OTHER PUBLICATIONS

IPRP for Application No. PCT/US2014/034166 dated Sep. 16, 2014.
Non-Final Office Action mailed Dec. 16, 2014 for application No. 13467159.

* cited by examiner

*Primary Examiner* — Scott B Christensen
(74) *Attorney, Agent, or Firm* — NKK Patent Law, PLLC

(57) ABSTRACT

Embodiments of the present disclosure include techniques for optimization on downloading/streaming activities of media and/or other files (e.g., on a local client, or a local proxy on a mobile device). An example of such downloading/streaming is a user accessing media content including video and/or audio content using a mobile device such as a smart phone, a tablet, or a "phablet," etc.

37 Claims, 16 Drawing Sheets

ADAPTIVE DOWNLOADING OR STREAMING TO CONSERVE MOBILE DEVICE OR NETWORK RESOURCES

CROSS REFERENCE TO RELATED APPLICATION

This application claims benefit of and priority to U.S. Provisional Patent Application No. 61/812,018 entitled "Device/User Adaptive Progressive or Selective-Size Downloading or Streaming to Conserve Mobile Device or Network Resources," which was filed on Apr. 15, 2013, the contents of which are incorporated by reference herein.

BRIEF DESCRIPTION OF THE DRAWINGS

The present embodiments are illustrated by way of example and are not intended to be limited by the figures of the accompanying drawings. In the drawings:

FIG. 1A-2 depicts another example diagram illustrating the download optimization engine of FIG. 1A-1 being implemented as a part of a client-proxy;

FIG. 1I depicts an example diagram illustrating data flows between example client side components in a distributed proxy and cache system;

FIG. 2 depicts example functional components of a mobile device implementing the download optimization engine;

The same reference numbers and any acronyms identify elements or acts with the same or similar structure or functionality throughout the drawings and specification for ease of understanding and convenience.

DETAILED DESCRIPTION

Figures 1, 1A:
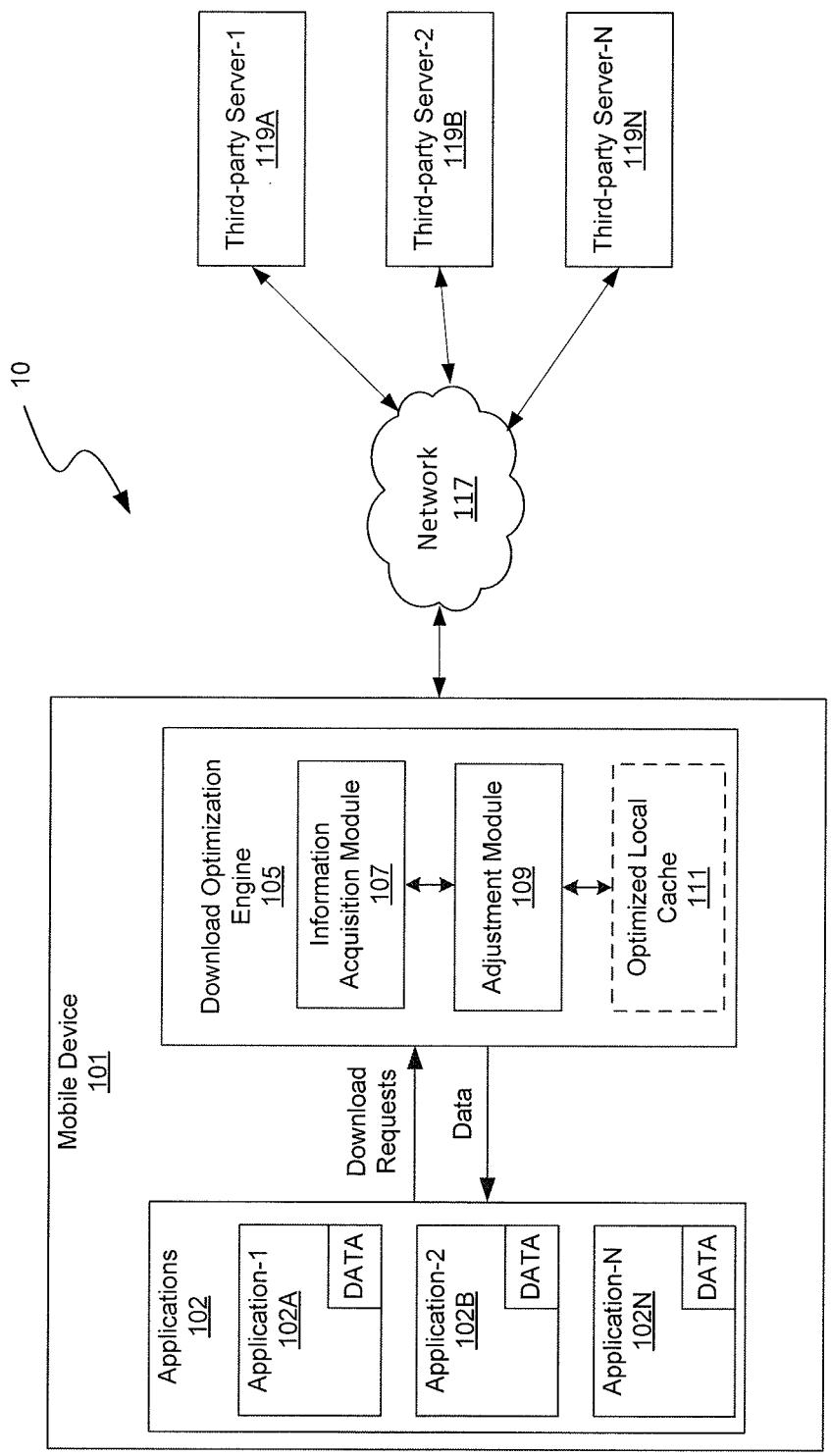
FIG. 1A-1 depicts a diagram illustrating example resources, including a download optimization engine, that implement the adaptive downloading and/or streaming optimization techniques disclosed herein.

Techniques are disclosed for optimizing downloading/streaming of media and other files using device-or-user-adaptive progressive/selective-size downloading/streaming and/or content caching. In one embodiment, a method comprises acquiring information that is specific to a user of a client device; and selectively adjusting one or more requests for downloading (e.g., progressive downloading or other suitable downloading protocols) or streaming (e.g., one or more streaming protocols) portions of a media file based on the acquired information. In some embodiments, the method further comprises selectively caching the one or more downloaded portions of the media file based on the acquired information. The device specific information can include user-specific information, and additionally, device properties or operating parameter information. Among other advantages, embodiments disclosed herein enable dynamic, fine-grained adjustment to the requests made by the client device based on user-specific information and/or device-specific properties, thereby reducing power and network resources consumptions, avoiding redundant end-to-end signaling, reducing network congestion, and providing higher efficiency to the overall network.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain tennis may be highlighted, for example using italics and/or quotation marks.

The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1A-1 depicts a diagram 10 illustrating example resources that implement the download/streaming optimization techniques disclosed herein. Included in the diagram 10 are a mobile device 101, a plurality of third-party servers 119, and a communications network 117.

The server 119 may be one or more server computers or work stations that are employed by a merchant for hosting websites that function as a channel to customer users for browsing, enjoying media products (e.g., a movie, a video-on-demand, or a music album), and/or placing purchase orders. The server 119 typically includes at least one processor and a memory, and may be further connected to one or more computers (not shown in FIG. 1 for simplicity) that manage inventory, logistics and/or other commercial functions via the network 117. As an additional embodiment, a host server that facilitates management of traffic, content caching, and/or resource conservation (e.g., the host server 100, described in FIG. 1B below; not shown in FIG. 1A for simplicity) can also be coupled to the network 117; the host server can include a download optimization proxy (e.g., proxy 179, FIG. 1F) that further assists the mobile device 101 in performing the download/streaming optimization techniques disclosed herein. Depending on the embodiment, this host server may be hosted by a third party (e.g., the third-party servers 119).

Applications 102 (e.g., applications 102A-102N) are example applications of the mobile device 101. Applications 102 on mobile device 101 can communicate directly to the third-party servers 119 via the network 117. Some examples of applications 102 include news application, weather services, web browsers with multimedia capabilities, video-sharing applications, online radio and music stations, video-on-demand services, and/or social network applications. In general, each application 102 receives a plurality of data (e.g., audio streams or video clips) relevant or necessary to the normal operations of the application from the third-party servers 119.

The embodiments disclosed herein recognize that, as on-demand video/audio streaming and/or downloading services, wireless mobile networks, as well as smart portable devices (e.g., mobile device 101) become popular, a large amount or portion of video/audio files are downloaded without being actually viewed or listened by the user. Further, the embodiments disclosed herein also recognized that many users repeatedly play their favorite media files such as funny video clips for self-entertaining and social purposes.

Furthermore, the embodiments disclosed herein recognize that traditional techniques for online media file playback have been focused on channel conditions of network, and specifically on improving user experience when connection conditions of the network 117 deteriorates. Example techniques include "streaming" audio and/or video files using a variety of communication protocols (e.g., Real Time Messaging Protocol (RTMP), or Real-time Transport Protocol (RTP)). Another example technique is so-called "progressive downloading," which allows the user to begin playback of the media file even before the download for the file is complete or near complete. Progressive downloading enables a media player (e.g., application 102A) to playback with intact meta data in the header of the file along with partial data of the digital media file in a local buffer, as the file being downloaded from a server (e.g., server 119A). The media player or mobile application which is capable of media content playback, for example on mobile device, begins to play when a specified, less than full amount of data becomes available to in the buffer. One example version of progressive downloading which can be used for partial or specified partial content download, in one embodiment, is described in Hypertext Transfer Protocol (HTTP)/1.1 206 Partial Content.

However, the aforementioned existing techniques and/or protocols do not take user behaviors and/or device specific properties into consideration, and therefore they typically would facilitate downloading and/or streaming at the best rate that the channel condition of the network 117 can support, even when the user has paused the playback or when the power resource of the mobile device 101 is near depletion. As the mobile devices now become more powerful than ever, so are the power and data consumption associated with generating and communicating these data. Indeed, there is an increased multitude of applications running on the mobile devices, and each application consumes more and more resources including, for example, central processing unit(s), memory space, battery power, network bandwidth, and so on. From a practical standpoint, data service subscriptions purchased by mobile network subscribers also charge their fees (sometimes exponentially) by the amount of data used, and therefore a reduction in unnecessary data consumption is desirable.

According to the embodiments provided herein, the mobile device 101 can dynamically perform media and other files downloading optimization based on user-specific information and/or device-specific properties in order to, among other purposes, reduce unnecessary power and/or data consumption while minimizing adverse impacts on user experience.

Therefore, in one embodiment, the mobile device 101 includes a download optimization engine 105 that can acquire information (e.g., by utilizing an information acquisition module 107) that is specific to a user of the mobile device 101 and can dynamically adjust (e.g., by utilizing an adjustment module 109) one or more requests made from the applications 102 based on the acquired information. The information acquisition module 107 can gather user-specific information by monitoring user activities including, for example, play, pause, stop, close, fast forward, rewind, put in the background or bring back to the foreground, share with other users, tag, share in social networks or other viral-marketing/social activities, and/or minimize a browser, application, or a media player (e.g., application 102A). The acquisition module 107 can also gather user behavioral information including, for example, one or more favorite or most frequently played media or specific times or day, days of week, etc., that the user accesses and interacts with media or certain types of media, or media related to certain topics, or media accessed via certain mobile applications.

The information acquisition module 107 can also gather device properties information by monitoring the operating parameters including, for example, wireless signal strength, residual battery resource, types of network connected, network congestion, network failure, network received signal strength indication (RSSI), and/or network bandwidth availability/consumption.

Based on the acquired information (any of the above in singular or in suitable combination), the download optimization engine 105 can, for example, revise a size in the requests, or replace the requests with requests of a new size, suspend or resume the requests, combine or divide the requests, and/or modify a protocol of the requests (e.g., from streaming to progressive downloading), and/or use one or more protocols that are capable of selective-size downloading, and in a further embodiment, factoring into user behavior or device characteristics, or user behavior using a specific device.

Moreover, in some embodiments, the download optimization engine 105 further includes an optimized local cache 111 that can selectively cache downloaded portions of the media file based on the acquired information. For example, the media files that are favorite (e.g., as determined automatically and/or specified by the user), which are likely to be played back most frequently, are cached in the optimized local cache 111. Notably, this optimized local cache 111 may be in part or in whole same/different from the already existing local cache (e.g., local data cache 185, discussed with respect to FIG. 1E).

Figures 1, 1A, 2:
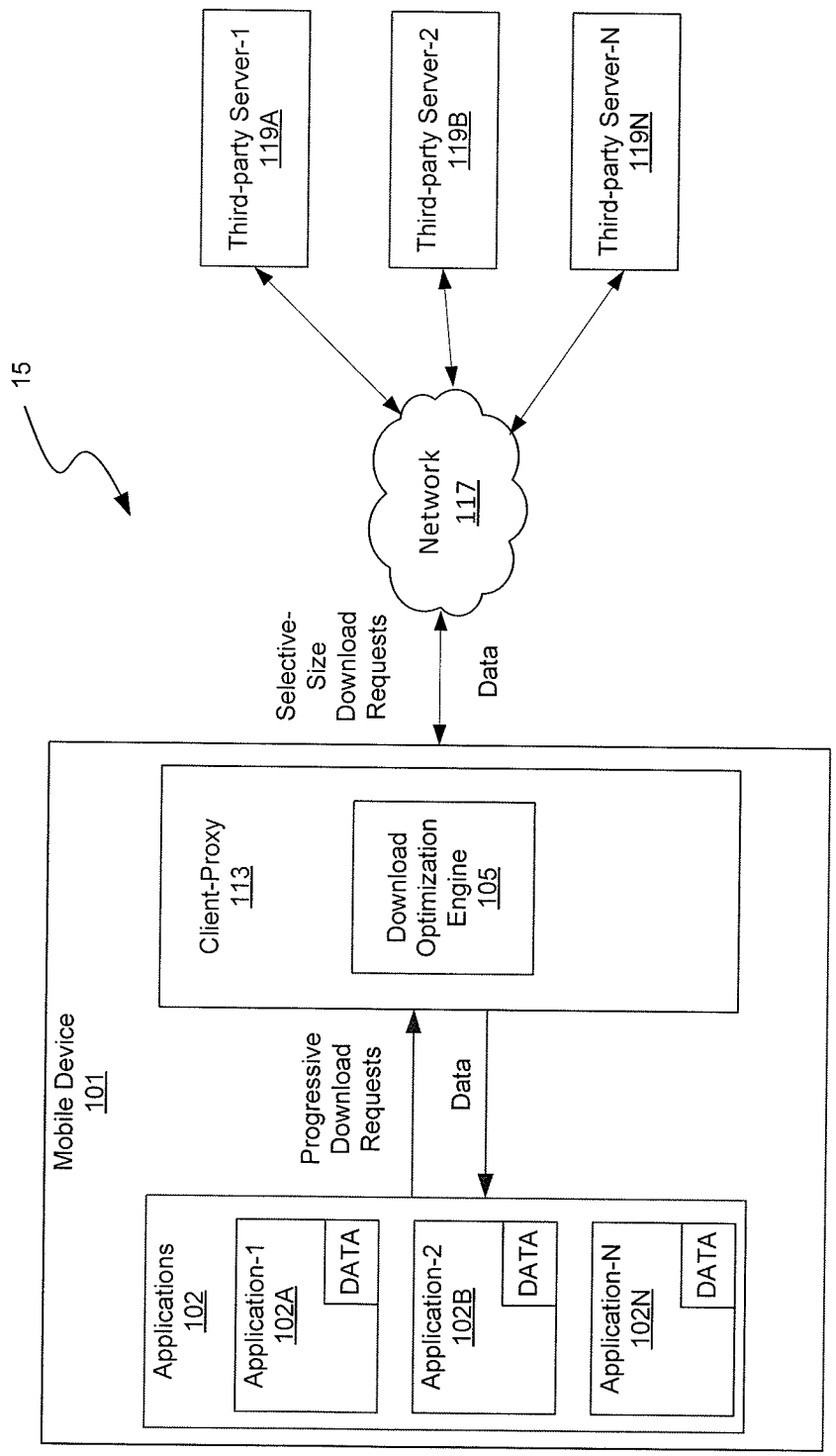

FIG. 1A-2 depicts another example diagram 15 illustrating the download optimization engine of FIG. 1A-1 being implemented as a part of a client-proxy 113 (e.g., proxy 175, discussed with respect to FIG. 1E below). In diagram 15, the download optimization engine 105 in the client-proxy 113 can intercept downloading/streaming requests including, for example, progressive downloading or RTP streaming requests. The engine 105 can then adaptively translates/converts/adjusts the intercepted requests based on the gathered information (e.g., by the information acquisition module 107, FIG. 1A-1). For example, the engine 105 in proxy 175 can intercept (e.g., from OS kernel level function calls or other suitable ways) progressive downloading requests, and can translate/convert them into selective-size downloading requests (e.g., adjusting the size or range of the progressive downloading requests, or converting the original requests into another types of requests, etc.).

These aforementioned and additional embodiments and implementations of the disclosed download/streaming optimization by device and/or user-adaptive partial and selective-size download and/or selective content caching techniques are described in more details below.

Figure 1B:
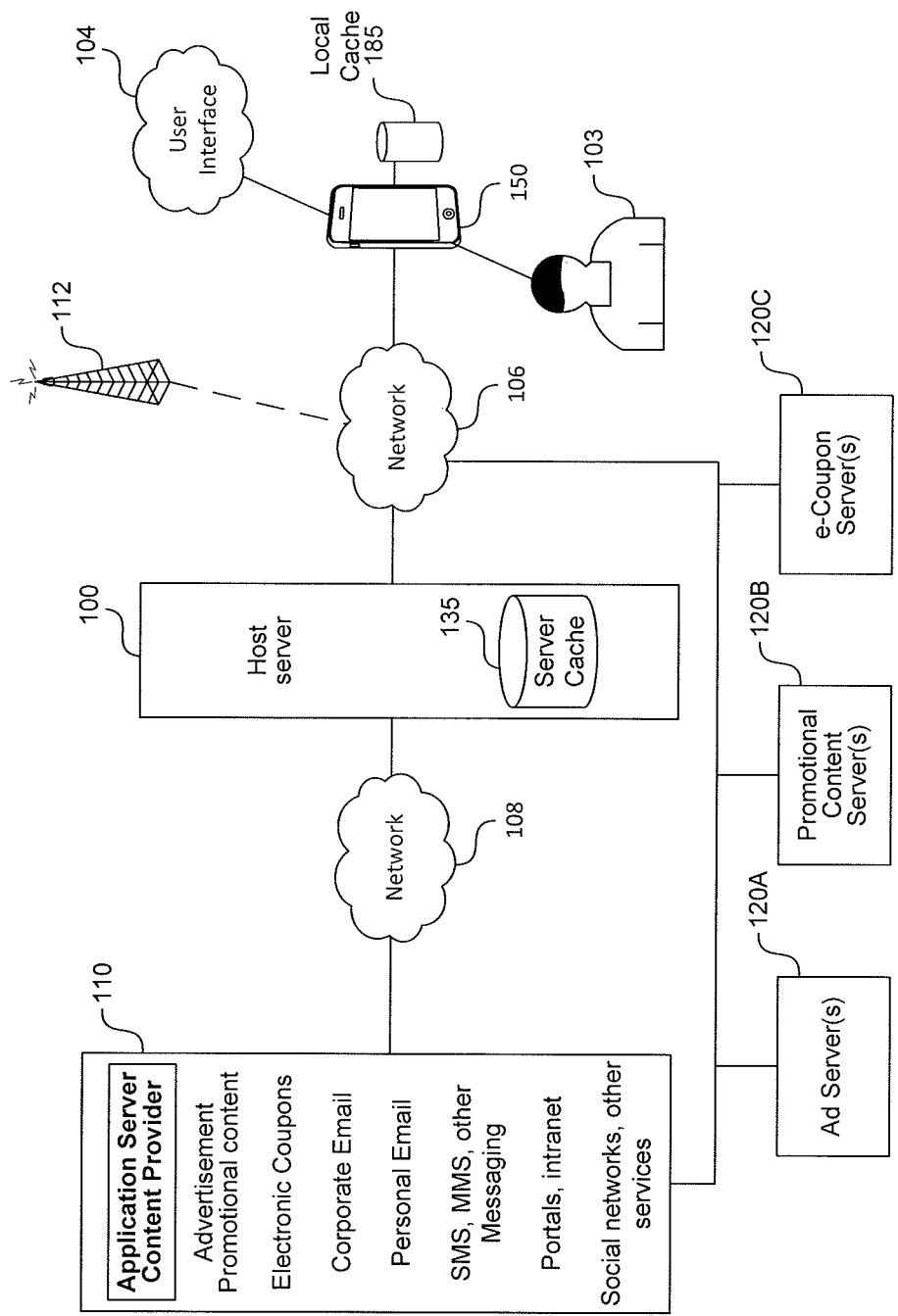
FIG. 1B depicts an example diagram of a system where a host server facilitates management of traffic, content caching, and/or resource conservation, and/or adaptive downloading and/or streaming.

FIG. 1B illustrates an example diagram of a system where a host server 100 facilitates management of traffic, content caching, and/or resource conservation and/or media file download optimization between mobile devices (e.g., wireless devices 150), and an application server or content provider 110, or other servers such as an ad server 120A, promotional content server 120B, or an e-coupon server 120C in a wireless network (or broadband network) for resource conservation. The host server 100 can further interact with mobile or client devices 150 for getting reports and/or updates on resource usage, savings, and the like.

The client devices 150 can be any system and/or device, and/or any combination of devices/systems that is able to establish a connection, including wired, wireless, cellular connections with another device, a server and/or other systems such as host server 100 and/or application server/content provider 110. Client devices 150 typically include a display and/or other output functionalities to present information and data exchanged between among the devices 150 and/or the host server 100 and/or application server/content provider 110. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

For example, the client/mobile devices 150 can include mobile, hand held or portable devices, wireless devices, or non-portable devices and can be any of, but not limited to, a server desktop, a desktop computer, a computer cluster, or portable devices, including a notebook, a laptop computer, a handheld computer, a palmtop computer, a mobile phone, a cell phone, a smart phone, a PDA, a Blackberry device, a Palm device, any tablet, a "phablet" (a class of smart phones with larger screen sizes between a typical smart phone and tablet), a handheld tablet (e.g., an iPad, the Galaxy series, the Nexus, the Kindles, Kindle Fires, any Android-based tablet, Windows-based tablet, Amazon e-Readers or other readers, or any other tablet), any portable readers/reading devices, a hand held console, a hand held gaming device or console, a head mounted device, a head mounted display, a thin client or any SuperPhone such as the iPhone, and/or any other portable, mobile, hand held devices, or fixed wireless interface such as a M2M device, etc. In one embodiment, the client devices 150 (or mobile device 150), host server 100, and application server 110 are coupled via a network 106 and/or a network 108. In some embodiments, the devices 150 and host server 100 may be directly connected to one another.

The input mechanism on client devices 150 can include touch screen keypad (including single touch, multi-touch, gesture sensing in 2D or 3D, etc.), a physical keypad, a mouse, a pointer, a track pad, a stylus, a stylus detector/sensor/receptor, motion detector/sensor (e.g., including 1-axis, 2-axis, 3-axis accelerometer, etc.), a face detector/recognizer, a retinal detector/scanner, a light sensor, capacitance sensor, resistance sensor, temperature sensor, proximity sensor, a piezoelectric device, device orientation detector (e.g., electronic compass, tilt sensor, rotation sensor, gyroscope, accelerometer), or any combination of the above.

Signals received or detected indicating user activity at client devices 150 through one or more of the above input mechanism, or others, can be used in the disclosed technology in obtaining context awareness at the client device 150. Context awareness at client devices 150 generally includes, by way of example but not limitation, client device 150 operation or state acknowledgement, management, user activity/behavior/interaction awareness, detection, sensing, tracking, trending, and/or application (e.g., mobile applications) type, behavior, activity, operating state, etc.

Context awareness in the present disclosure also includes knowledge and detection of network side contextual data and can include network information such as network capacity, bandwidth, traffic, type of network/connectivity, and/or any other operational state data and/or mobile application loading and/or activities. Network side contextual data can be received from and/or queried from network service providers (e.g., cell provider 112 and/or Internet service providers) of the network 106 and/or network 108 (e.g., by the host server and/or devices 150). In addition to application context awareness as determined from the client side 150, the application context awareness may also be received from or acquired/queried from the respective application/service providers 110 (by the host 100 and/or client devices 150).

The host server 100 can use, for example, contextual information acquired for client devices 150, networks 106/108, applications (e.g., mobile applications), application server/provider 110, or any combination of the above, to manage the traffic in the system to satisfy data needs of the client devices 150 (e.g., to satisfy application or any other request including HTTP request). In one embodiment, the traffic is managed by the host server 100 to satisfy data requests made in response to explicit or non-explicit user 103 requests and/or device/application maintenance tasks. The traffic can be managed such that network consumption, for example, use of the cellular network is conserved for effective and efficient bandwidth utilization. In addition, the host server 100 can manage and coordinate such traffic in the system such that use of device 150 side resources (e.g., including but not limited to battery power consumption, radio use, processor/memory use) are optimized with a general philosophy for resource conservation while still optimizing performance and user experience.

For example, in context of battery conservation, the device 150 can observe user activity (for example, by observing user keystrokes, backlight status, or other signals via one or more input mechanisms, etc.) and alters device 150 behaviors. The device 150 can also request the host server 100 to alter the behavior for network resource consumption based on user activity or behavior.

In one embodiment, the traffic management for resource conservation and/or media file download optimization are performed using a distributed system between the host server 100 and client device 150. The distributed system can include proxy server and cache components on the server side 100 and on the device/client side, for example, as shown by the server cache 135 on the server 100 side and the local cache 185 on the client 150 side.

Functions and techniques disclosed for context aware traffic management and/or media file download optimization for resource conservation in networks (e.g., network 106 and/or 108) and devices 150, can reside in a distributed proxy and cache system. The proxy and cache system can be distributed between, and reside on, a given client device 150 in part or in whole and/or host server 100 in part or in whole. The distributed proxy and cache system are illustrated with further reference to the example diagram shown in FIG. 1C. Notably, in some embodiments of such systems, the application server 110 can include the third-party servers 119 (FIG. 1A), and/or the mobile device 150 can include the mobile device 101 (FIG. 1A).

In one embodiment, client devices 150 communicate with the host server 100 and/or the application server 110 over network 106, which can be a cellular network and/or a broadband network. To facilitate overall traffic management and/or mobile application offloading between devices 150 and various application servers/content providers 110 to implement network (bandwidth utilization) and device resource (e.g., battery consumption), the host server 100 can communicate with the application server/providers 110 over the network 108, which can include the Internet (e.g., a broadband network).

In general, the networks 106 and/or 108, over which the client devices 150, the host server 100, and/or application server 110 communicate, may be a cellular network, a broadband network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, UDP, HTTP, DNS, FTP, UPnP, NSF, ISDN, PDH, RS-232, SDH, SONET, etc.

The networks 106 and/or 108 can be any collection of distinct networks operating wholly or partially in conjunction to provide connectivity to the client devices 150 and the host server 100 and may appear as one or more networks to the serviced systems and devices. In one embodiment, communications to and from the client devices 150 can be achieved by, an open network, such as the Internet, or a private network, broadband network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Figure 1C:
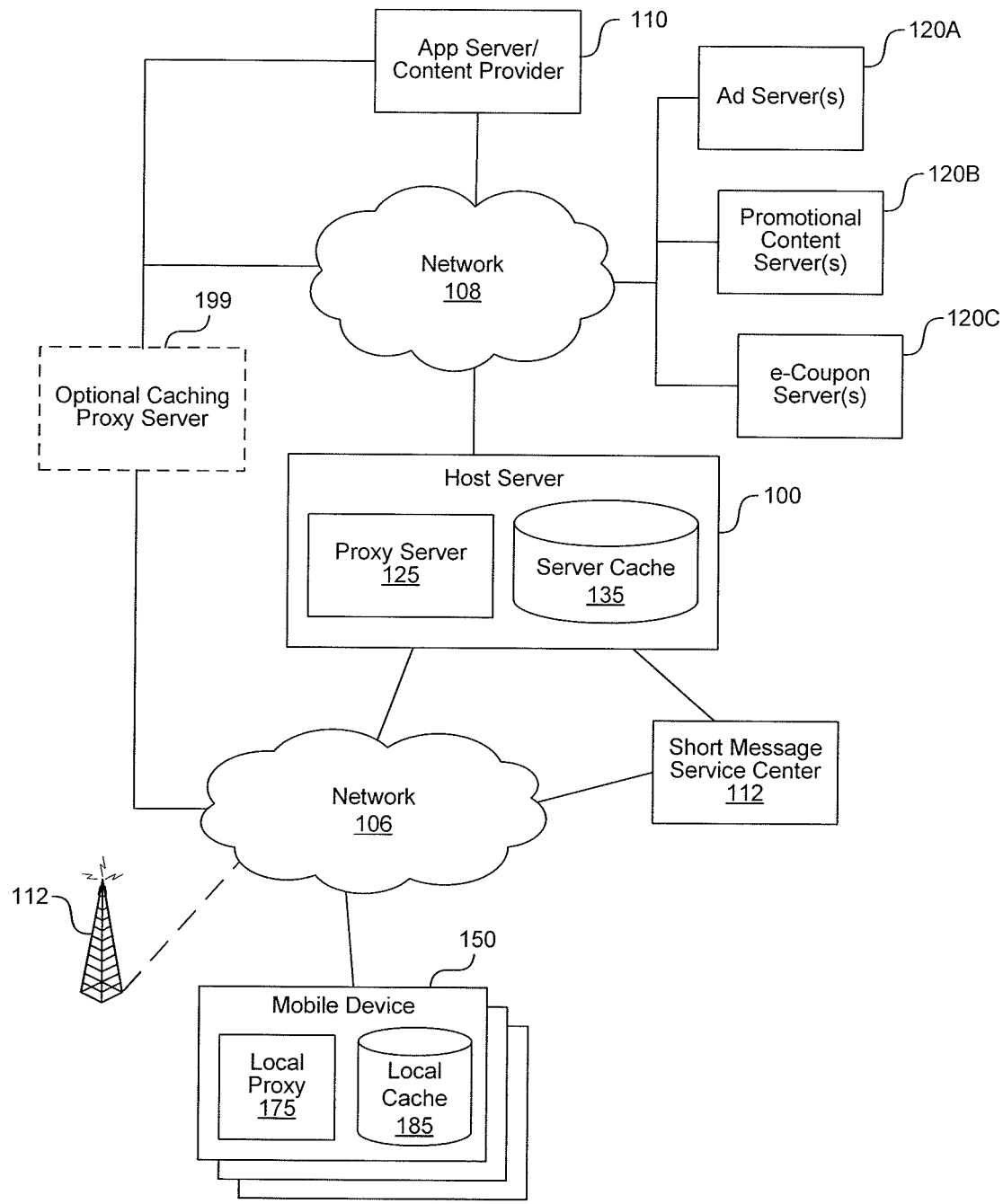
FIG. 1C depicts an example diagram of a proxy and cache system distributed between the host server and device which reduces mobile networks signaling and conserves mobile device battery consumption through adaptive progressive or selective size downloading or streaming and/or content caching.

FIG. 1C illustrates an example diagram of a proxy and cache system distributed between the host server 100 and device 150 which facilitates network traffic management and/or mobile application offloading between the device 150 and an application server or content provider 110, or other servers such as an ad server 120A, promotional content server 120B, or an e-coupon server 120C for resource conservation and content caching. The proxy system distributed among the host server 100 and the device 150 can further track alarms, timers or other triggers implemented by applications on a device and resources used by such alarms, timers, or other triggers to determine associations using which the proxy system can manipulate the alarms, timers or other triggers to occur at an optimal time to reduce resource usage. The proxy system can further implement media file download/streaming optimization techniques disclosed herein.

The distributed proxy and cache system can include, for example, the proxy server 125 (e.g., remote proxy) and the server cache, 135 components on the server side. The server-side proxy 125 and cache 135 can, as illustrated, reside internal to the host server 100. In addition, the proxy server 125 and cache 135 on the server-side can be partially or wholly external to the host server 100 and in communication via one or more of the networks 106 and 108. For example, the proxy server 125 may be external to the host server and the server cache 135 may be maintained at the host server 100. Alternatively, the proxy server 125 may be within the host server 100 while the server cache is external to the host server 100. In addition, each of the proxy server 125 and the cache 135 may be partially internal to the host server 100 and partially external to the host server 100. The application server/content provider 110 can by any server including third party servers or service/content providers further including advertisement, promotional content, publication, or electronic coupon servers or services. Similarly, separate advertisement servers 120A, promotional content servers 120B, and/or e-Coupon servers 120C as application servers or content providers are illustrated by way of example.

The distributed system can also, include, in one embodiment, client-side components, including by way of example but not limitation, a local proxy 175 (e.g., a mobile client on a mobile device) and/or a local cache 185, which can, as illustrated, reside internal to the device 150 (e.g., a mobile device).

In addition, the client-side proxy 175 and local cache 185 can be partially or wholly external to the device 150 and in communication via one or more of the networks 106 and 108. For example, the local proxy 175 may be external to the device 150 and the local cache 185 may be maintained at the device 150. Alternatively, the local proxy 175 may be within the device 150 while the local cache 185 is external to the device 150. In addition, each of the proxy 175 and the cache 185 may be partially internal to the host server 100 and partially external to the host server 100.

In one embodiment, the distributed system can include an optional caching proxy server 199. The caching proxy server 199 can be a component which is operated by the application server/content provider 110, the host server 100, or a network service provider 112, and or any combination of the above to facilitate network traffic management for network and device resource conservation. Proxy server 199 can be used, for example, for caching content to be provided to the device 150, for example, from one or more of, the application server/provider 110, host server 100, and/or a network service provider 112. Content caching can also be entirely or partially performed by the remote proxy 125 to satisfy application requests or other data requests at the device 150.

In context aware traffic management and optimization for resource conservation in a network (e.g., cellular or other wireless networks), characteristics of user activity/behavior and/or application behavior at a mobile device (e.g., any wireless device) 150 can be tracked by the local proxy 175 and communicated, over the network 106 to the proxy server 125 component in the host server 100, for example, as connection metadata. The proxy server 125 which in turn is coupled to the application server/provider 110 provides content and data to satisfy requests made at the device 150.

In addition, the local proxy 175 can identify and retrieve mobile device properties, including one or more of, battery level, network that the device is registered on, radio state, or whether the mobile device is being used (e.g., interacted with by a user). In some instances, the local proxy 175 can delay, expedite (prefetch), and/or modify data prior to transmission to the proxy server 125, when appropriate.

The local database 185 can be included in the local proxy 175 or coupled to the local proxy 175 and can be queried for a locally stored response to the data request prior to the data request being forwarded on to the proxy server 125. Locally cached responses can be used by the local proxy 175 to satisfy certain application requests of the mobile device 150, by retrieving cached content stored in the cache storage 185, when the cached content is still valid.

Similarly, the proxy server 125 of the host server 100 can also delay, expedite, or modify data from the local proxy prior to transmission to the content sources (e.g., the application server/content provider 110). In addition, the proxy server 125 uses device properties and connection metadata to generate rules for satisfying request of applications on the mobile device 150. The proxy server 125 can gather real time traffic information about requests of applications for later use in optimizing similar connections with the mobile device 150 or other mobile devices.

In general, the local proxy 175 and the proxy server 125 are transparent to the multiple applications executing on the mobile device. The local proxy 175 is generally transparent to the operating system or platform of the mobile device and may or may not be specific to device manufacturers. In some instances, the local proxy 175 is optionally customizable in part or in whole to be device specific. In some embodiments, the local proxy 175 may be bundled into a wireless model, a firewall, and/or a router.

In one embodiment, the host server 100 can in some instances, utilize the store and forward functions of a short message service center (SMSC) 112, such as that provided by the network service provider, in communicating with the device 150 in achieving network traffic management. Note that 112 can also utilize any other type of alternative channel including USSD or other network control mechanisms. The host server 100 can forward content or HTTP responses to the SMSC 112 such that it is automatically forwarded to the device 150 if available, and for subsequent forwarding if the device 150 is not currently available.

In general, the disclosed distributed proxy and cache system allows optimization of network usage, for example, by serving requests from the local cache 185, the local proxy 175 reduces the number of requests that need to be satisfied over the network 106. Further, the local proxy 175 and the proxy server 125 may filter irrelevant data from the communicated data. In addition, the local proxy 175 and the proxy server 125 can also accumulate low priority data and send it in batches to avoid the protocol overhead of sending individual data fragments. The local proxy 175 and the proxy server 125 can also compress or transcode the traffic, reducing the amount of data sent over the network 106 and/or 108. The signaling traffic in the network 106 and/or 108 can be reduced, as the networks are now used less often and the network traffic can be synchronized among individual applications.

With respect to the battery life of the mobile device 150, by serving application or content requests from the local cache 185, the local proxy 175 can reduce the number of times the radio module is powered up. The local proxy 175 and the proxy server 125 can work in conjunction to accumulate low priority data and send it in batches to reduce the number of times and/or amount of time when the radio is powered up. The local proxy 175 can synchronize the network use by performing the batched data transfer for all connections simultaneously.

Figure 1D:
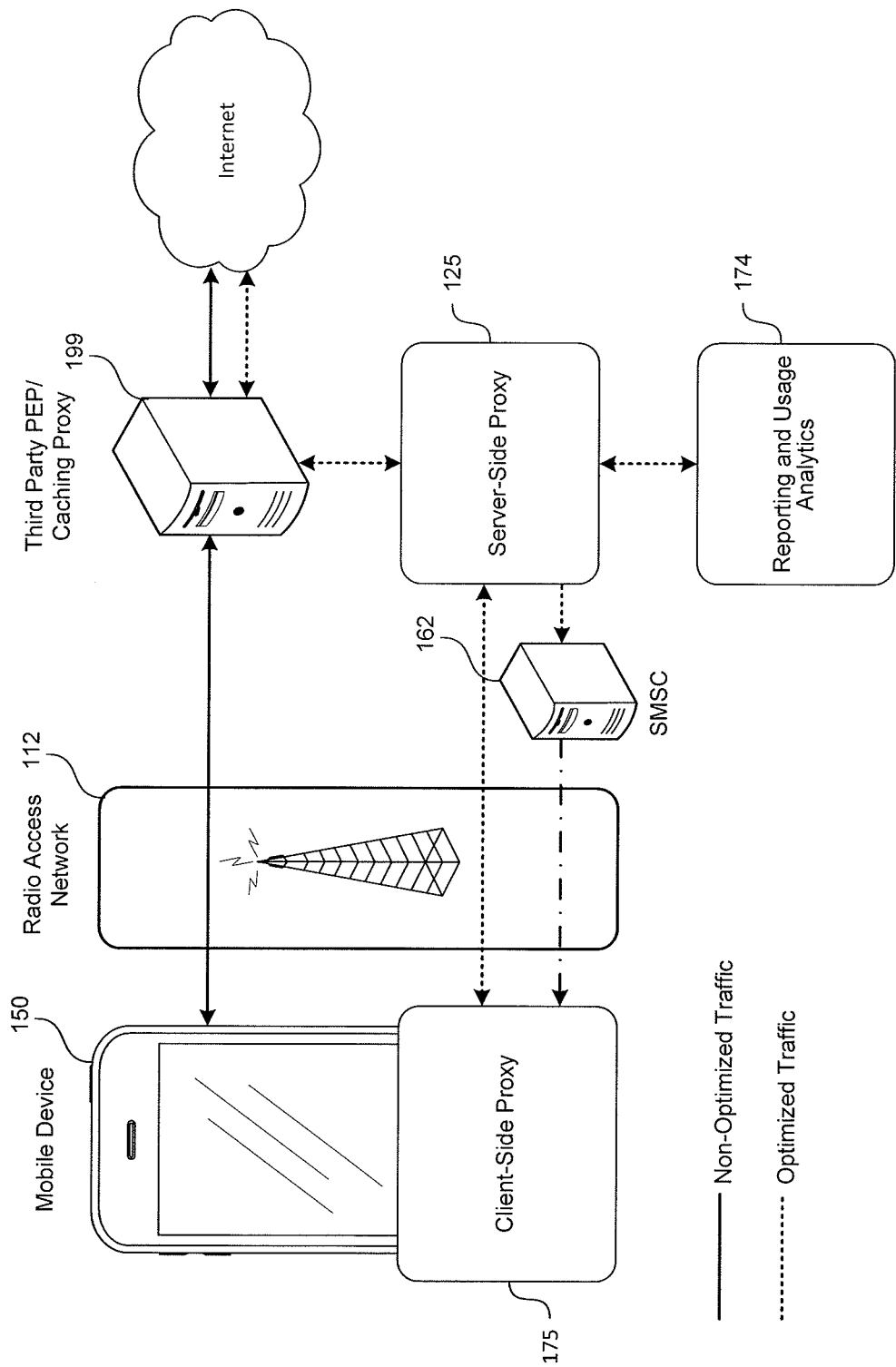
FIG. 1D depicts an example diagram of the logical architecture of a distributed proxy and cache system.

FIG. 1D illustrates an example diagram of the logical architecture of a distributed proxy and cache system.

The distributed system can include, for example the following components:

Client Side Proxy 175: a component installed in the Smartphone, mobile device or wireless device 150 that interfaces with device's operating system, as well as with data services and applications installed in the device. The client side proxy 175 is typically compliant with and able to operate with standard or state of the art networking protocols.

The server side proxy 125 can include one or more servers that can interface with third party application servers (e.g., 199), mobile operator's network (which can be proxy 199 or an additional server that is not illustrated) and/or the client side proxy 175. In general, the server side proxy 125 can be compliant with and is generally able to operate with standard or state of the art networking protocols and/or specifications for interacting with mobile network elements and/or third party servers.

Reporting and Usage Analytics Server 174: The Reporting and Usage Analytics system or component 174 can collect information from the client side 175 and/or the server side 125 and provides the necessary tools for producing reports and usage analytics can used for analyzing traffic and signaling data. Such analytics can be used by the proxy system in managing/reducing network traffic or by the network operator in monitoring their networks for possible improvements and enhancements. Note that the reporting and usage analytics system/component 174 as illustrated, may be a server separate from the server-side proxy 125, or it may be a component of the server-side proxy 125, residing partially or wholly therein.

Figure 1E:
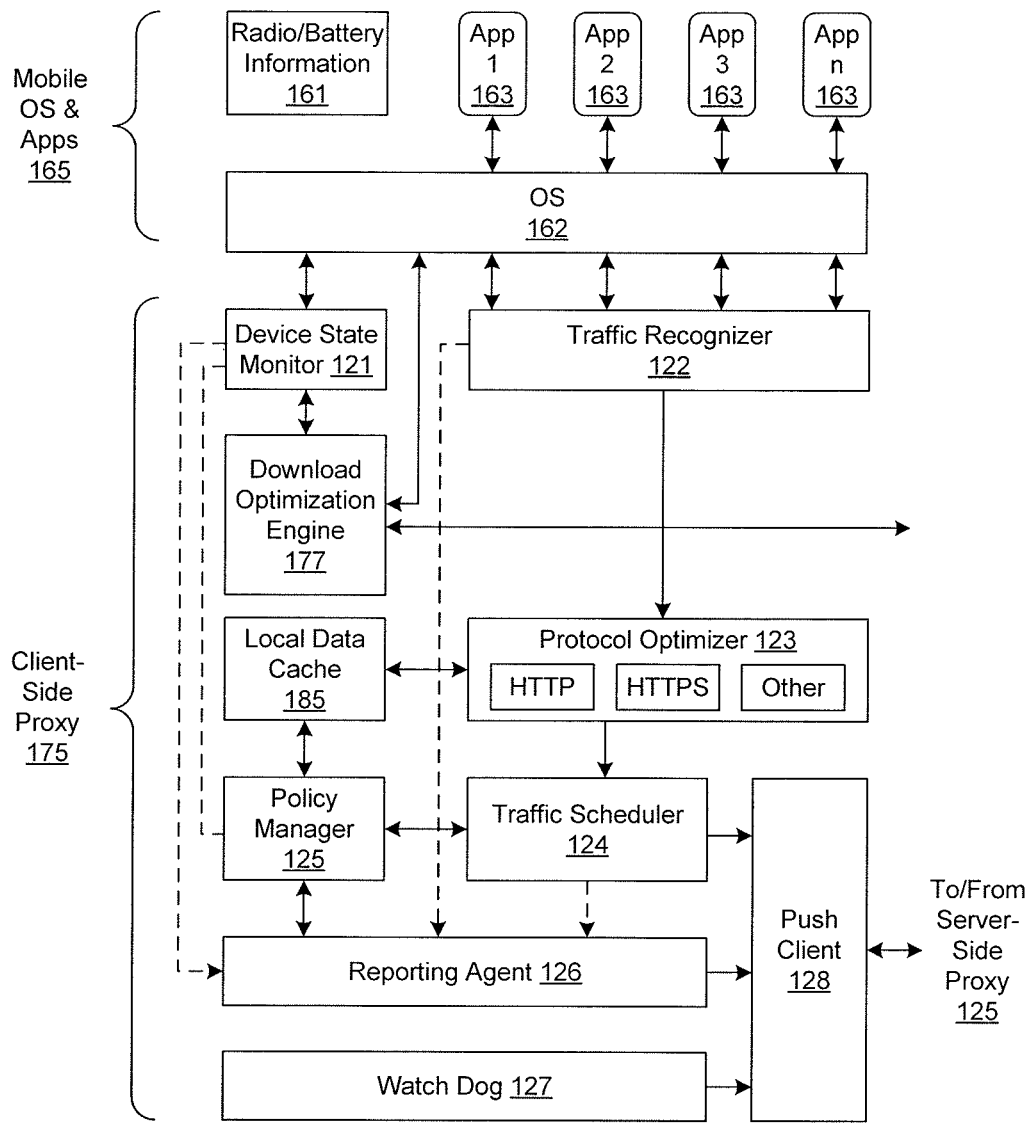
FIG. 1E depicts an example diagram showing the architecture of client side components in a distributed proxy and cache system with a download optimization engine implemented on the client-side proxy.

FIG. 1E illustrates an example diagram showing the architecture of client side components in a distributed proxy and cache system.

The client side components 175 can include software components or agents installed on the mobile device that enables traffic optimization and performs the related functionalities on the client side. Components of the client side proxy 175 can operate transparently for end users and applications 163. The client side proxy 175 can be installed on mobile devices for optimization to take place, and it can effectuate changes on the data routes. Once data routing is modified, the client side proxy 175 can respond to application requests to service providers or host servers, in addition to or instead of letting those applications 163 access data network directly. In general, applications 163 on the mobile device do not notice that the client side proxy 175 is responding to their requests. Some example components of the client side proxy 175 are described as follows:

Device State Monitor 121: The device state monitor 121 can be responsible for identifying several states and metrics in the device, such as network status, display status, battery level, etc. such that the remaining components in the client side proxy 175 can operate and make decisions according to device state, acting in an optimal way in each state.

Download Optimization Engine 177: Similar to what are mentioned with regard to FIG. 1A, the download optimization engine 177 can perform the media file download/streaming optimization techniques disclosed herein. In the embodiment shown in FIG. 1E, the optimization engine 177 is coupled to the device state monitor 121 to receive application activity, battery, network status, as well as user selection, an administrator's selection, and/or other suitable information in determining adjustments to the requests in performing the media file download optimization. Optionally, the optimization engine 177 can also communicate with a download optimization proxy 179 (FIG. 1F, discussed below) within the server-side proxy 125 for further optimizing the media downloading. Such collaborative optimization between engine 177 and proxy 179 can include, for example, establishing a downloading/streaming using selective-size techniques/protocols to substitute the original downloading/streaming requests, and/or selectively caching data that are downloaded/streamed based on the gathered device-or-user-specific information.

Traffic Recognizer 122: The traffic recognizer 122 analyzes all traffic between the wireless device applications 163 and their respective host servers in order to identify recurrent patterns. Supported transport protocols include, for example, DNS, HTTP and HTTPS, such that traffic through those ports is directed to the client side proxy 175. While analyzing traffic, the client side proxy 175 can identify recurring polling patterns which can be candidates to be performed remotely by the server side proxy 125, and send to the protocol optimizer 123.

Protocol Optimizer 123: The protocol optimizer 123 can implement the logic of serving recurrent request from the local cache 185 instead of allowing those request go over the network to the service provider/application host server. One is its tasks is to eliminate or minimize the need to send requests to the network, positively affecting network congestion and device battery life.

Local Cache 185: The local cache 185 can store responses to recurrent requests, and can be used by the Protocol Optimizer 123 to send responses to the applications 163. The local cache 185 may further store one or more downloaded portions of media files based on the acquired information in a way that is described herein regarding the media file download/streaming optimization techniques. Notably, in some embodiments, the local cache 185 comprises the optimized local cache 111 of FIG. 1A, and the applications 163 comprises the applications 102 of FIG. 1A.

Traffic Scheduler 124: The traffic scheduler 124 can temporally move communications to optimize usage of device resources by unifying keep-alive signaling so that some or all of the different applications 163 can send keep-alive messages at the same time (traffic pipelining). Traffic scheduler 124 may also decide to delay transmission of data that is not relevant at a given time (for example, when the device is not actively used).

Policy Manager 125: The policy manager 125 can store and enforce traffic optimization and reporting policies provisioned by a Policy Management Server (PMS). At the client side proxy 175 first start, traffic optimization and reporting policies (policy profiles) that is to be enforced in a particular device can be provisioned by the Policy Management Server.

Watch Dog 127: The watch dog 127 can monitor the client side proxy 175 operating availability. In case the client side proxy 175 is not working due to a failure or because it has been disabled, the watchdog 127 can reset DNS routing rules information and can restore original DNS settings for the device to continue working until the client side proxy 175 service is restored.

Reporting Agent 126: The reporting agent 126 can gather information about the events taking place in the device and sends the information to the Reporting Server. Event details are stored temporarily in the device and transferred to reporting server only when the data channel state is active. If the client side proxy 175 doesn't send records within twenty-four hours, the reporting agent 126 may attempt to open the connection and send recorded entries or, in case there are no entries in storage, an empty reporting packet. All reporting settings are configured in the policy management server.

Push Client 128: The push client 128 can be responsible for the traffic to between the server side proxy 125 and the client side proxy 175. The push client 128 can send out service requests like content update requests and policy update requests, and receives updates to those requests from the server side proxy 125. In addition, push client 128 can send data to a reporting server (e.g., the reporting and/or usage analytics system which may be internal to or external to the server side proxy 125).

The proxy server 199 has a wide variety of uses, from speeding up a web server by caching repeated requests, to caching web, DNS and other network lookups for a group of clients sharing network resources. The proxy server 199 is optional. The distributed proxy and cache system (125 and/or 175) allows for a flexible proxy configuration using either the proxy 199, additional proxy(s) in operator's network, or integrating both proxies 199 and an operator's or other third-party's proxy.

Figure 1F:
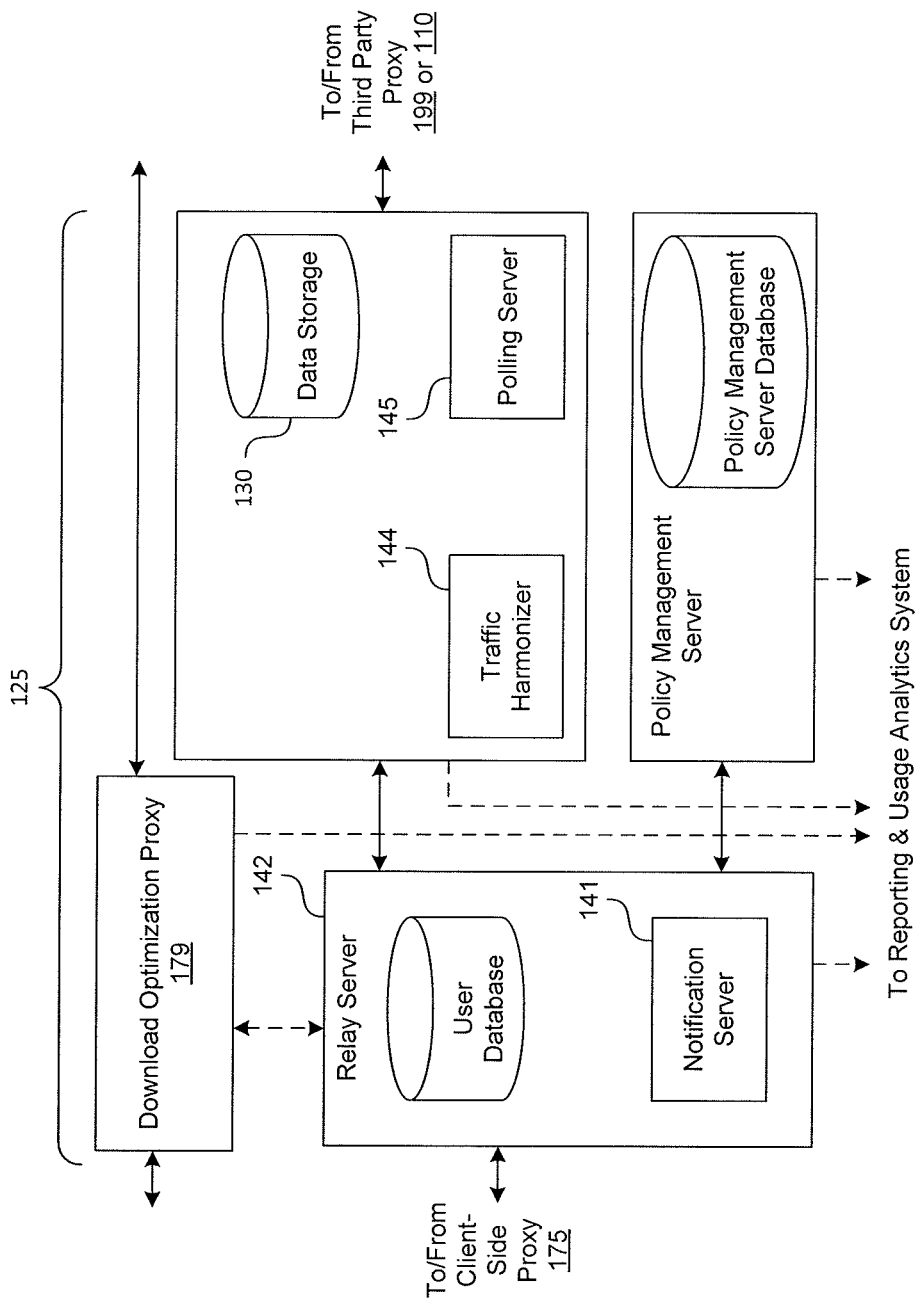
FIG. 1F depicts an example diagram of the example components on the server side of the distributed proxy and cache system with a download optimization proxy implemented on the server-side proxy.

FIG. 1F illustrates a diagram of the example components on the server side of the distributed proxy and cache system.

The server side 125 of the distributed system can include, for example a relay server 142, which interacts with a traffic harmonizer 144, a polling server 145 and/or a policy management server 143. Each of the various components can communicate with the client side proxy 175, or other third party (e.g., application server/service provider 110 and/or other proxy 199) and/or a reporting and usage analytics system. Some example components of the server side proxy 125 is described as follows:

Relay Server 142: The relay server 142 is the routing agent in the distributed proxy architecture. The relay server 142 manages connections and communications with components on the client-side proxy 175 installed on devices and provides an administrative interface for reports, provisioning, platform setup, and so on.

Download Optimization Proxy 179: In some embodiments, the download optimization proxy 179 can perform, in conjunction with the download optimization engine 177 (FIG. 1E), the media file download/streaming optimization techniques disclosed herein. In some embodiments, such as the one shown in FIG. 1F, the download optimization proxy 179 is coupled to the relay server 142 to receive relevant connection and communication information for performing the media downloading optimization. The download optimization proxy 179 can communicate to third-party servers 110, 119 or proxies 199, and can download the requested media file from the third-party servers 110, 119 to the host server 100. Then, the download optimization proxy 179 may deliver the media file to optimization engine 177 if such delivery brings resource conservation or other benefits. For example, the download optimization proxy 179 and the download optimization engine 177 can together modify TCP signaling between the client-proxy 175 and the server-proxy 125 in reducing end-to-end signaling. In addition, optimization proxy 179 can facilitate video/audio optimization and/or compression on the media file(s) to reduce necessary signaling and bandwidth consumption, thereby conserving computing and power resources on the mobile device 150, 101.

Notification Server 141: The notification server 141 is a module able to connect to an operator's SMSC gateways and deliver SMS notifications to the client-side proxy 175. SMS notifications can be used when an IP link is not currently active, in order to avoid the client-side proxy 175 from activating a connection over the wireless data channel, thus avoiding additional signaling traffic. However, if the IP connection happens to be open for some other traffic, the notification server 141 can use it for sending the notifications to the client-side proxy 175. The user database can store operational data including endpoint (MSISDN), organization and Notification server 141 gateway for each resource (URIs or URLs).

Traffic Harmonizer 144: The traffic harmonizer 144 can be responsible for communication between the client-side proxy 175 and the polling server 145. The traffic harmonizer 144 connects to the polling server 145 directly or through the data storage 130, and to the client over any open or proprietary protocol such as the 7TP, implemented for traffic optimization. The traffic harmonizer 144 can be also responsible for traffic pipelining on the server side: if there's cached content in the database for the same client, this can be sent over to the client in one message.

Polling Server 145: The polling server 145 can poll third party application servers on behalf of applications that are being optimized). If a change occurs (i.e. new data available) for an application, the polling server 145 can report to the traffic harmonizer 144 which in turn sends a notification message to the client-side proxy 175 for it to clear the cache and allow application to poll application server directly.

Policy Management Server 143: The policy management server (PMS) 143 allows administrators to configure and store policies for the client-side proxies 175 (device clients). It also allows administrators to notify the client-side proxies 175 about policy changes. Using the policy management server 143, each operator can configure the policies to work in the most efficient way for the unique characteristics of each particular mobile operator's network.

Reporting and Usage Analytics Component: The Reporting and Usage Analytics component or system collects information from the client side 175 and/or from the server side 125, and provides the tools for producing reports and usage analytics that operators can use for analyzing application signaling and data consumption.

Most mobile applications regularly poll their application servers to check for new data. Often there is no new data or the content has not changed, so the exchange of data through the mobile network is unnecessary. As the number of mobile phones and their applications increase, the amount of this needless polling grows. Since applications are not coordinated and poll at different times and intervals, any given phone may frequently generate signal traffic. This causes multiple unnecessary radio activations, consuming power and shortening battery life.

In one embodiment, the signaling optimizer reduces network requests to a minimum by caching content in the client and letting its own server poll for changes in the network. When a mobile phone's client side proxy (e.g., local proxy) 175 detects a recurring pattern for a resource, such as an email application, its response content is stored locally in a client cache so similar requests from that application get their response from the local cache, rather than signaling the network.

In another embodiment, systems and methods of intelligent alarm tracker and resource manipulator can be used to reduce network requests by consolidating or changing the timing of requests such that use of resources including network, battery, CPU, memory and the like can be reduced.

In some embodiments, features of the signaling optimizer and the intelligent alarm tracker and resource manipulator may be used together to obtain reduced resource usage by mobile applications on a mobile device.

Figure 1G:
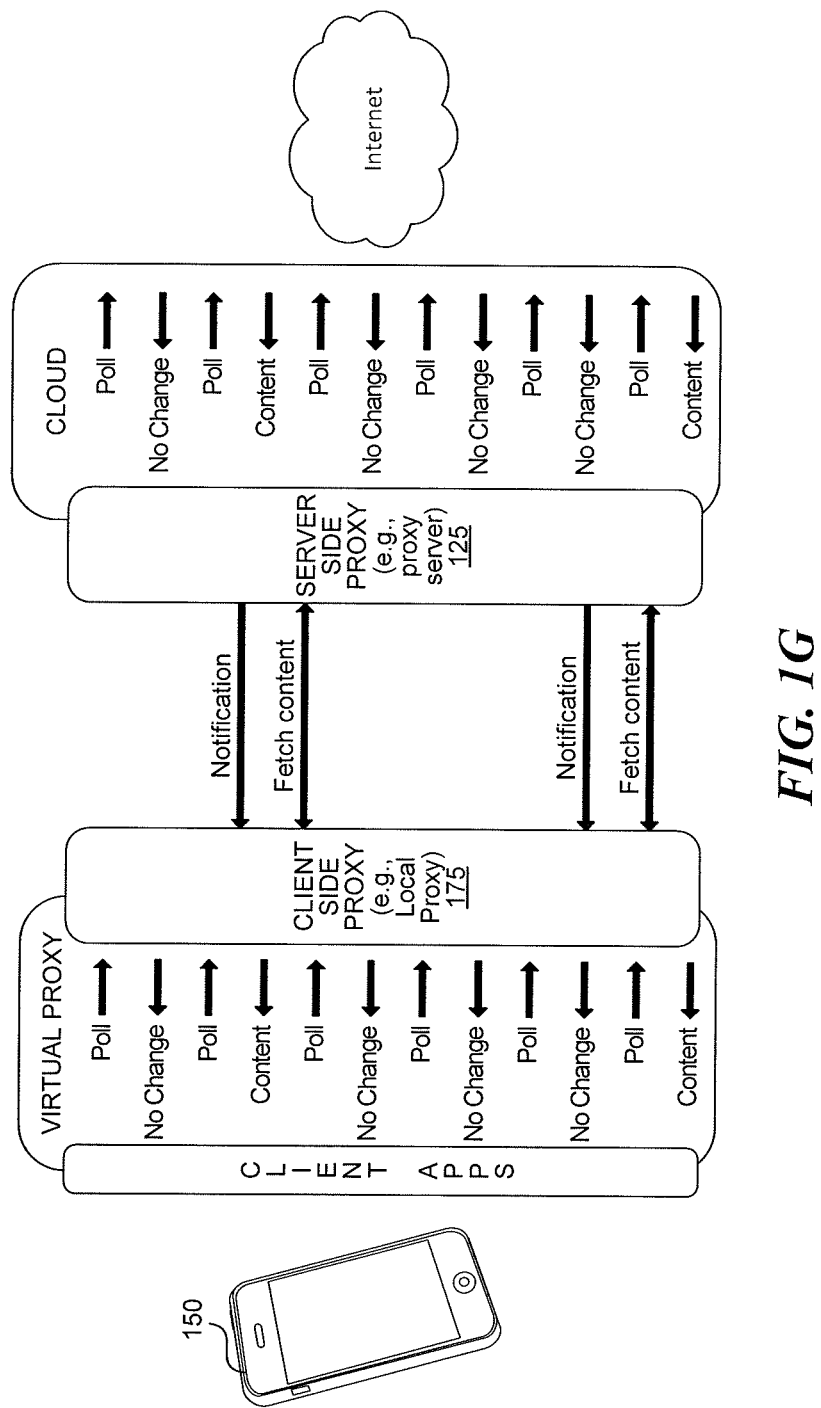
FIG. 1G depicts an example diagram of a signaling optimizer of the distributed proxy and cache system.

FIG. 1G illustrates an example diagram of a signaling optimizer of the distributed proxy and cache system.

As an example, someone who typically gets only 10 emails a day may have phone's email application poll the network for new email every 15 minutes, or 96 times a day, with around 90% or more of the polls resulting in the same response: there are no new emails. The client side proxy (e.g., local proxy) 175 can recognize this request—response pattern, and intercepts the application's poll requests, returning the locally cached response of "no new emails". This way the device radio is not turned on by this particular application, and the poll doesn't use any network resources. The server (e.g., host server 100, proxy server 125), located in the network, can monitor the email application server on behalf of the user's email application. When new email is available, the server can notify the user's client side proxy 175 to not use the cached "no new emails" response for the next poll request. Instead of going to the local client cache, the email application polls its application server over the network and receives the new content.

The signaling optimizer can be configured and managed using different rule sets for different device types, user types, wireless networks, and applications. Optimization rules can be updated at any time, so the changes can be applied immediately when an application upgrades or changes happen in the mobile network. The protocols that can be optimized include, but are not limited to: HTTP, HTTPS and DNS.

Figure 1H:
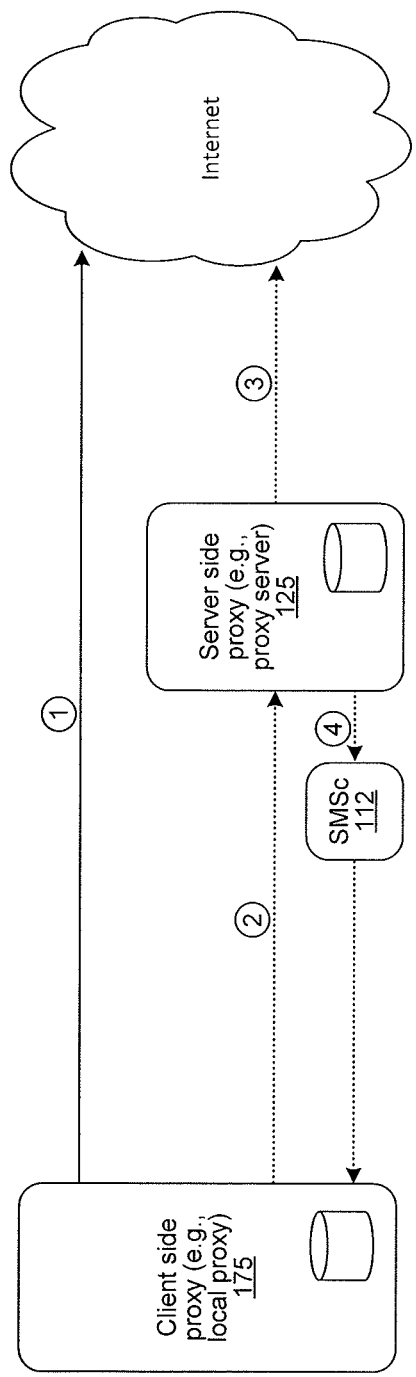
FIG. 1H depicts an example diagram of an example client-server architecture of the distributed proxy and cache system.
Figure 11:
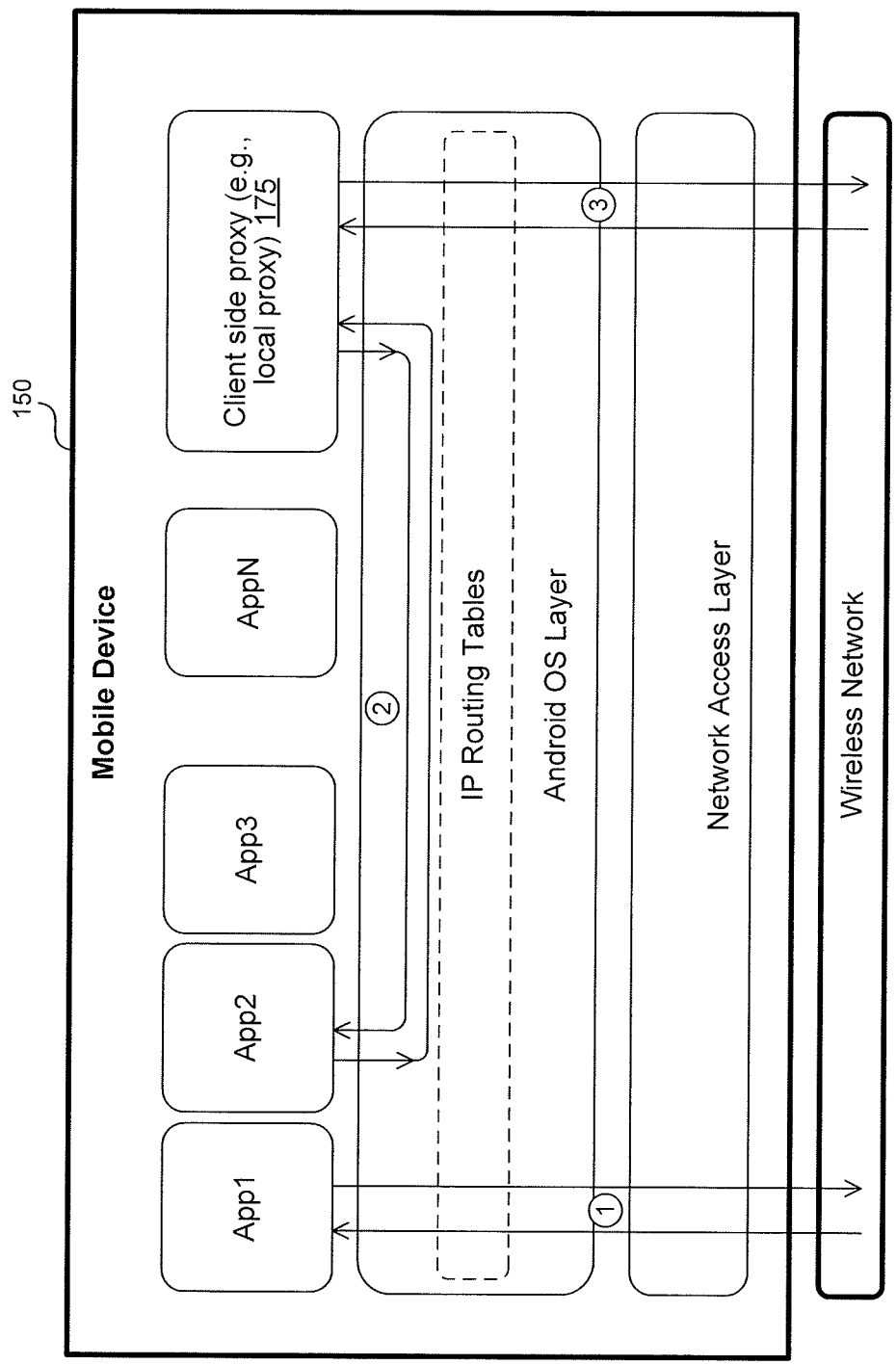
Figure 2:
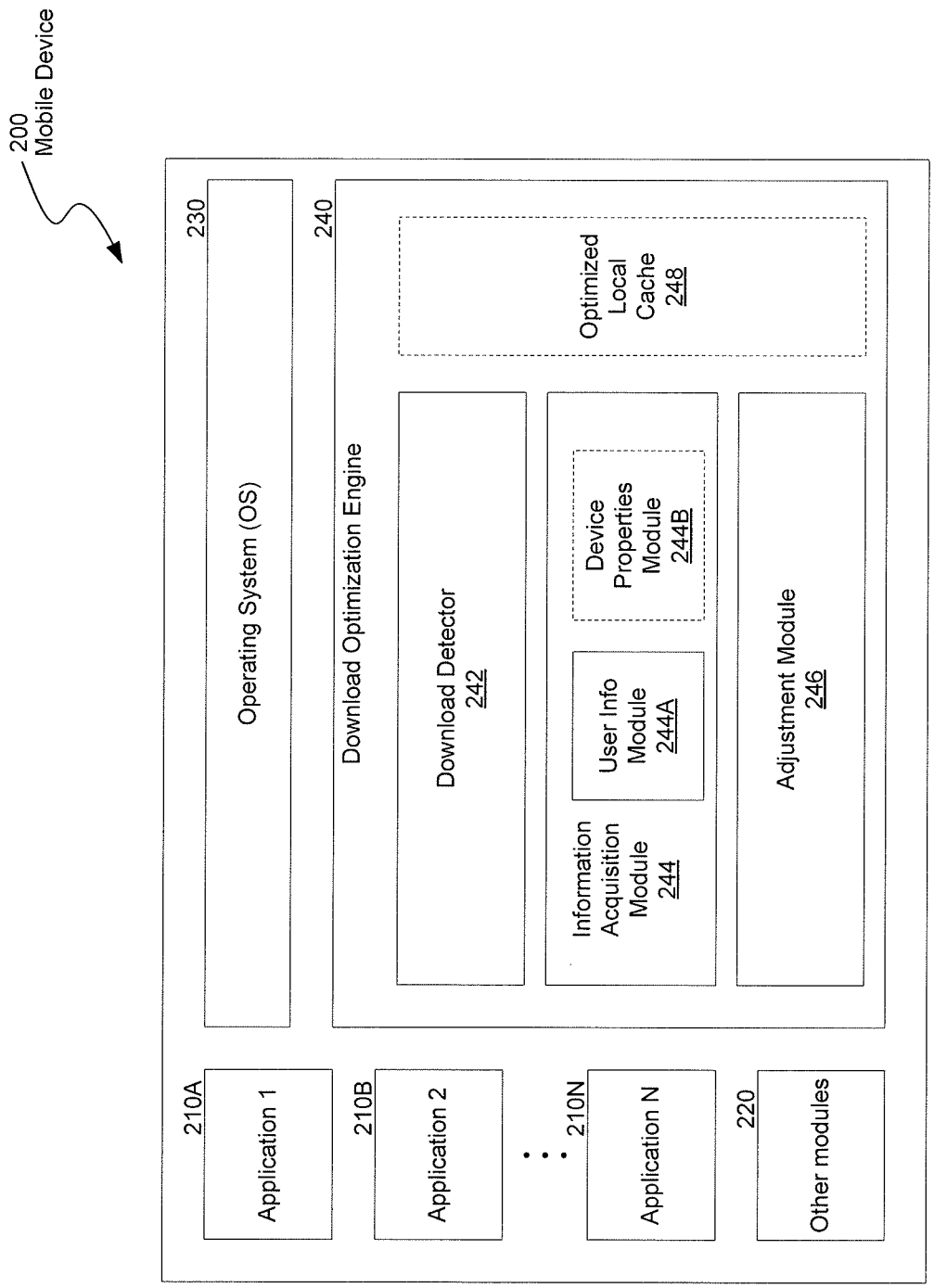

FIG. 1H illustrates an example diagram of an example client-server architecture of the distributed proxy and cache system.

In the client-server architecture, the client side proxy 175 (e.g., local proxy) is residing on the mobile or client devices. The client side proxy 175 can communicate both directly to the Internet (usually via an operator proxy) and to the server side proxy (e.g., proxy server) 125, or the host server 100. The proxy server 125 communicates to the Internet and to the operator's SMSC 112.

As depicted, the client side proxy 175 can send a request directly to the Internet. This can happen after requests have been analyzed to detect optimizable patterns, for example. The client side proxy 175 can, in one implementation, send a request to the server (e.g., host server 100, proxy server 125), for example, to initiate server polling, to reports logs or to get new configuration. The proxy server 125 can send a request to the Internet to, for example, validate cached content. In one implementation, the proxy server 125 can send a request to the SMSC 112, for example, to send a cache invalidate message or policy update message to the client-side proxy 175.

In one implementation, the client side proxy 175 may not maintain an open connection with the proxy server 125, but may connect to the proxy server 125 only in case there's a need to start polling an origin server 110, to report logs or to get new configuration. For signaling optimizer feature, the proxy server 125 can notify the client side proxy 175 when the content, that has been polled, has changed. The proxy server 125 can send a request to invalidate cache in the client side proxy 125. When the application connects to that particular origin server (e.g., content server 110) the next time, it can first fetch the latest content from the proxy server 125 and then directly connect to the origin server 110. For the policy enforcer and/or the network protector features, the proxy server 125 can notify the client side proxy 175 when there's new configuration to be fetched from the server. When the proxy server 125 needs to communicate with the client side proxy 175, it can use a connection that is already open for some other request. If the connection is not open, the proxy server 125 can send a notification (e.g., SMS) to the client side proxy 175.

FIG. 1I depicts an example diagram illustrating data flows between example client side components in a distributed proxy and cache system. Traffic from applications (e.g., App1, App2, App3 to AppN), client side proxy (e.g., local proxy) 175, IP Routing Tables (e.g., in the Android Operating System Layer), Network Access Layer and Wireless Network are depicted.

In one implementation, non-optimized application traffic flow, such as traffic from App1, can completely bypass the client side proxy 175 components and proceed directly through the operating system layer (e.g., the Android OS layer) and Network Access Layer to the wireless network. Traffic that that is not optimized can include, but is not limited to: rich media, like video and audio, as well as traffic from networks and applications that has been configured to bypass optimization and traffic pending optimization, and the like. In one embodiment, all traffic can be configured to bypass the client side/server side proxy.

In another implementation, optimized application traffic, such as traffic from App2, can be redirected from the application to the client side proxy 175. By default, this can be traffic on ports 80 (HTTP) and 53 (DNS), and selected traffic on port 443 (HTTPS), for example. However, traffic to other ports can be configured to be directed to the client side proxy.

In yet another implementation, traffic flow can be between the client side proxy 175 and the origin servers (e.g., content server 110) via the Internet and/or between the client side proxy 175 and the server side proxy (e.g., proxy server) 125.

FIG. 2 depicts example functional components of a mobile device 200 implementing a download optimization engine 240. The mobile device 200 can include applications 210A-210N, an operating system (OS) 230, other platform specific and/or other modules 220 such as network interface components, sensor components, operating system native applications, etc., other components described in FIG. 1E. It is noted that, in some embodiments, the download optimization engine 240 is integrated into the OS 230.

The download optimization engine 240 of the mobile device 200, in one embodiment, can include a download detector 242, an information acquisition module 244, and an adjustment module 246. In some embodiments, the download optimization engine 240 further includes an optimized local cache 248. The information acquisition module 244 includes a user information module 244A, and can further include a device properties module 244B. Additional or less modules or components can be included in the download optimization engine 240. Depending on the implementation, one or more of the components can be consolidated into a single component, and/or a single component can be further divided into multiple components.

According to some embodiments, the download optimization engine 240 can perform media file download optimization such as adjusting size and/or range of progressive downloading, or performing selective size download in chunks, or adjusting streaming requests based on information acquired by module 244 (e.g., when application 210A pauses playing or becomes minimized) to reduce unnecessary power, data, and/or other resource consumptions on the mobile device 200 while maintaining functionalities and user experiences of the applications (e.g., application 210A).

Specifically, in one embodiment, the download detector 242 of the engine 240 can detect one or more requests for streaming or downloading portions of a media file sent from the application 210A. Example requests include "streaming" requests, such as RTP or RTMP messages, or "progressive downloading" requests, such as HTTP/1.1 206 messages. The download detector 242 can include one or more typical state machines to detect or identify such media downloading or streaming requests and/or traffic. In some embodiments, the download detector 242 can be a portion of the traffic recognizer 122 (FIG. 1E).

The information acquisition module 244 of the engine 240 can acquire information that is specific to a user of the mobile device 200. Specifically, the user information module 244A gathers user-specific information, which includes user activities such as playing, pausing, stopping, closing, fast forwarding, rewinding, putting in the background or bringing back to the foreground, sharing with other users, tagging, sharing in social networks or other viral-marketing/social activities, and/or minimizing a browser, application, or a media player (e.g., application 102A) that is responsible for playing back the media. In one embodiment, the user information module 244A monitors OS (e.g., an Android system) application programming interface (API) and/or system-calls to gather information on mobile applications 210A-N, such as pause, play, how many bytes played, or media format information.

The user-specific information can also contain behavioral information including, for example, the user's favorite media files, most frequently played files, most recently played files. Behavioral information can also include time information so that the favorites or frequently played files can be sorted by, for example, all time, this month, this week, etc. The favorite list of media files can be determined by the user's own selection, and/or can be determined by one or more heuristics. In some embodiments, the user information module 244A can have user profiles, each of which records behavioral information about a different user of the mobile device 200.

The information acquisition module 244 can also gather device-specific properties information. Specifically, the optional device properties module 244B monitors the operating parameters of the mobile device 200 which include, for example, wireless signal strength or channel conditions, residual battery resource, types of network connected, and/or network bandwidth consumption. Further example operating parameters can include video/audio codec, video frame rates, or media compression bit rates. In some embodiments, the information acquisition module 107 comprises a part of the device state monitor 121 of FIG. 1E.

Then, based on the acquired information, the adjustment module 246 of the engine 240 can selectively adjust one or more requests for downloading or streaming portions of a media file. In one embodiment, the requests (e.g., from applications 210A-N) are progressive downloading requests, and the adjustment module 246 can revise a download size of the requests based on the information. In another embodiment, the requests are streaming requests, and the adjustment module 246 can revise a streaming quality of the requests. According to one or more embodiments, the adjustment module 246 can also suspend/resume the requests, and/or combine/divide the requests based on the information. In some embodiments, the adjustment module 246 can select a compression ratio of the media file downloading/streaming.

For instance, mobile applications 210A-N (e.g., a web browser, or a mobile application) requests to progressively download a video clip from a third-party website (e.g., hosted by server 119A, FIG. 1A), and application 210A has started playback of the video clip while the video clip continues to download from the server 119A to mobile device 200. Now, if the user selects to pause the playback of the video clip, while traditional progressive downloading would continue the download, the optimization engine 240 can use the adjustment module 246 to, for example, pause the download until the user resumes the playback, or to modify the download requests so that only a small or smaller portion of the video clip is downloaded before the user resumes the playback.

Further, some embodiments of the adjustment module 246 can modify a protocol of the requests. In some examples, the optimization engine 240 can transform streaming requests into progressive downloading requests based on the information. In accordance with some embodiments, the adjustment module 246 comprises a part of the protocol optimizer 123 of FIG. 1E. In other embodiments, the optimization engine 240 employs the adjustment module 246 to adjust the requests when a network type is switched (e.g., from a mobile telephony data network (such as 4G LTE) to a wireless fidelity network (such as IEEE 802.11-N)).

In addition, the optimized local cache 248 of the engine 240 can selectively cache the one or more downloaded portions of the media file based on the information. Specifically, the aforesaid behavioral information can server as a basis for the engine 240 to determine what data, if any, to be stored in the local cache 248 to facilitate media file download/streaming optimization. For one example, user's favorite portions of videos and/or audios can be stored in the cache 248. In accordance with some embodiments, the optimized local cache 248 comprises a part of the local cache 185 of FIG. 1E.

Furthermore, in accordance with some embodiments, the download optimization engine 240 can communicate with a download optimization proxy (e.g., proxy 179, FIG. 1F) on a remote server (e.g., host server 100, FIG. 1B) in performing the download/streaming optimization. Specifically, the download optimization proxy 179 can receive messages from the optimization engine 240 regarding the obtained information, and can download the requested media file from the third-party servers 110, 119 to the host server 100 based on the obtained information. Then, the download optimization proxy 179 can deliver the media file to optimization engine 240 if such delivery brings resource conservation or other benefits. For example, the download optimization proxy 179 and the download optimization engine 240 can together modify TCP signaling between a client-proxy (e.g., client-proxy 175, FIG. 1E) and a server-proxy (e.g., server-proxy 125, FIG. 1F) in reducing end-to-end signaling. In addition, optimization proxy 179, together with the optimization engine 240, can facilitate video/audio optimization and/or compression on the media file(s) to reduce necessary signaling and bandwidth consumption, thereby conserving computing and power resources on the mobile device 200.

Moreover, the host server 100 of the server-proxy 125 and optimization proxy 179 can also aggregate the acquired information from mobile device 200 as well as from other similar devices. The aggregated information can be used to determine statistics among a plurality of users (e.g., using the reporting and usage analytics system/component 174, FIG. 1D), which can be in turn used to determine a most favorite or a most frequently played list among the users. The global statistics and/or the favorite lists can also be shared to the optimization engine 240 of the mobile device 200 to aid adaptive media file download/streaming optimization and/or selective caching in a similar way described above.

In this way, among other advantages, embodiments disclosed herein enable dynamic, fine-grained adjustment to the requests made by the client device based on user-specific information and/or device-specific properties, thereby reducing power and network resources consumptions, avoiding redundant end-to-end signaling, reducing network congestion, and providing higher efficiency to the overall network.

Figure 3A:
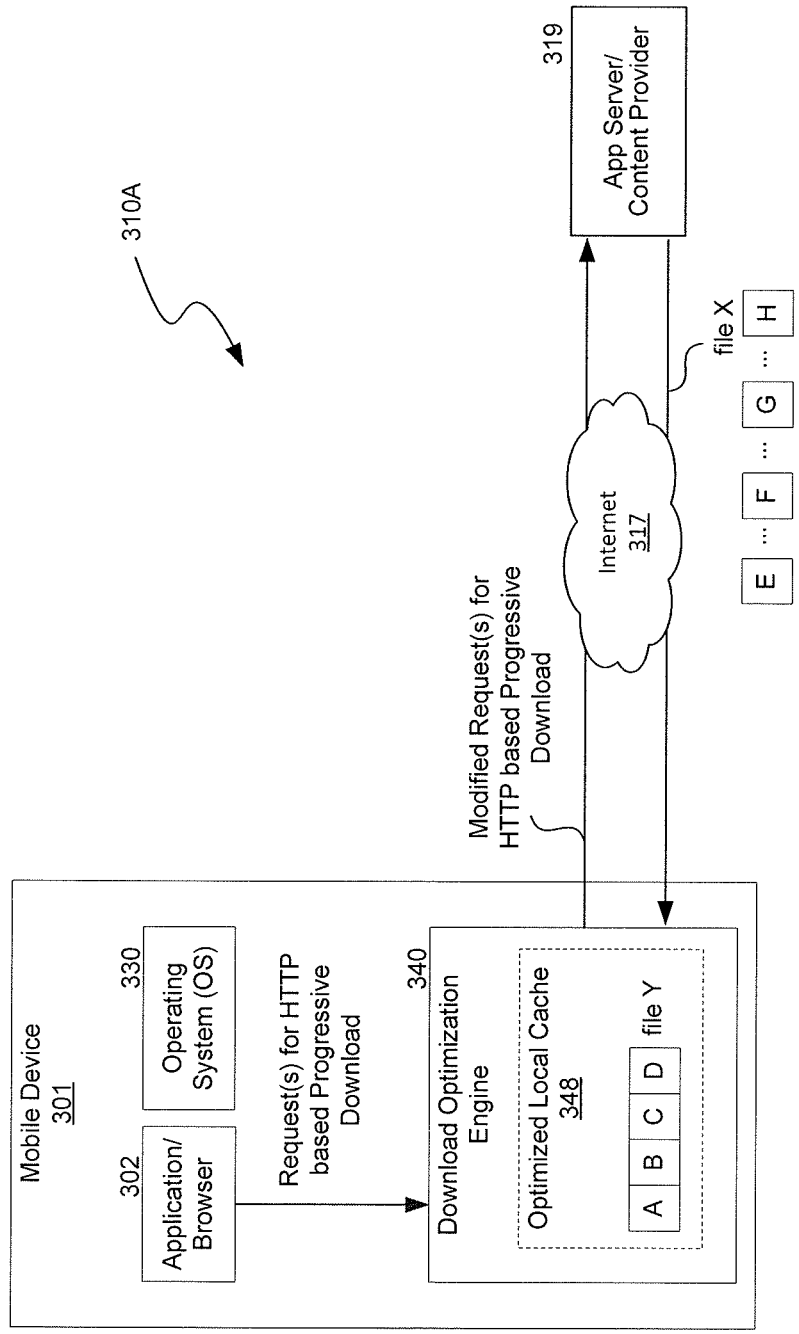
FIG. 3A depicts a diagram illustrating example resources, including a download optimization engine, that implement the adaptive downloading and/or streaming optimization techniques disclosed herein.

FIG. 3A depicts a diagram 310A illustrating example resources, including a download optimization engine, that implement the adaptive downloading and/or streaming optimization techniques disclosed herein.

The diagram 310A includes a mobile device 301. Mobile device may be mobile device 101 of FIGS. 1A-1, 1A-2 or mobile device 200 of FIG. 2, although alternative configurations are possible. In this example, the mobile device includes an application/browser 302, an operating system 330, and a download optimization engine 320. The application/browser 302 sends an "HTTP based Progressive download" request to the download optimization engine 320 (which may be included as part of a client-proxy), and download optimization engine 320 sends a request over a network (e.g., Internet 317) for selective size downloads from the destined server (i.e., app server/content provider 319).

The download optimization engine 320 serves and/or otherwise provides selective size downloads to the application/ browser 302 and continues to fetch new data (in selective size downloads) as and when application/browser 302 completes playing the existing downloaded data. As shown, the data associated with a file (e.g., file X) is received and processed in chunks (e.g., chunk E, F, G, and H). Each chunk can have different (adaptive) attributes based on the request for that chunk generated by the download optimization engine 320. Thus, overall traffic can be reduced based on conditions of the mobile device and/or the behavior of a user of the mobile device.

Additionally, the download optimization engine 320 maintains a small cache to cache favorite videos, and replays when requested for. In this example, media file Y is shown cached in an optimized local cache 348. The download optimization engine 320 includes an intelligent caching algorithm that determines when/if to cache media files. For example, based on frequency of access by the application/browser 302. Thus, overall network traffic can be further reduced with the use of a local cache.

Figure 3B:
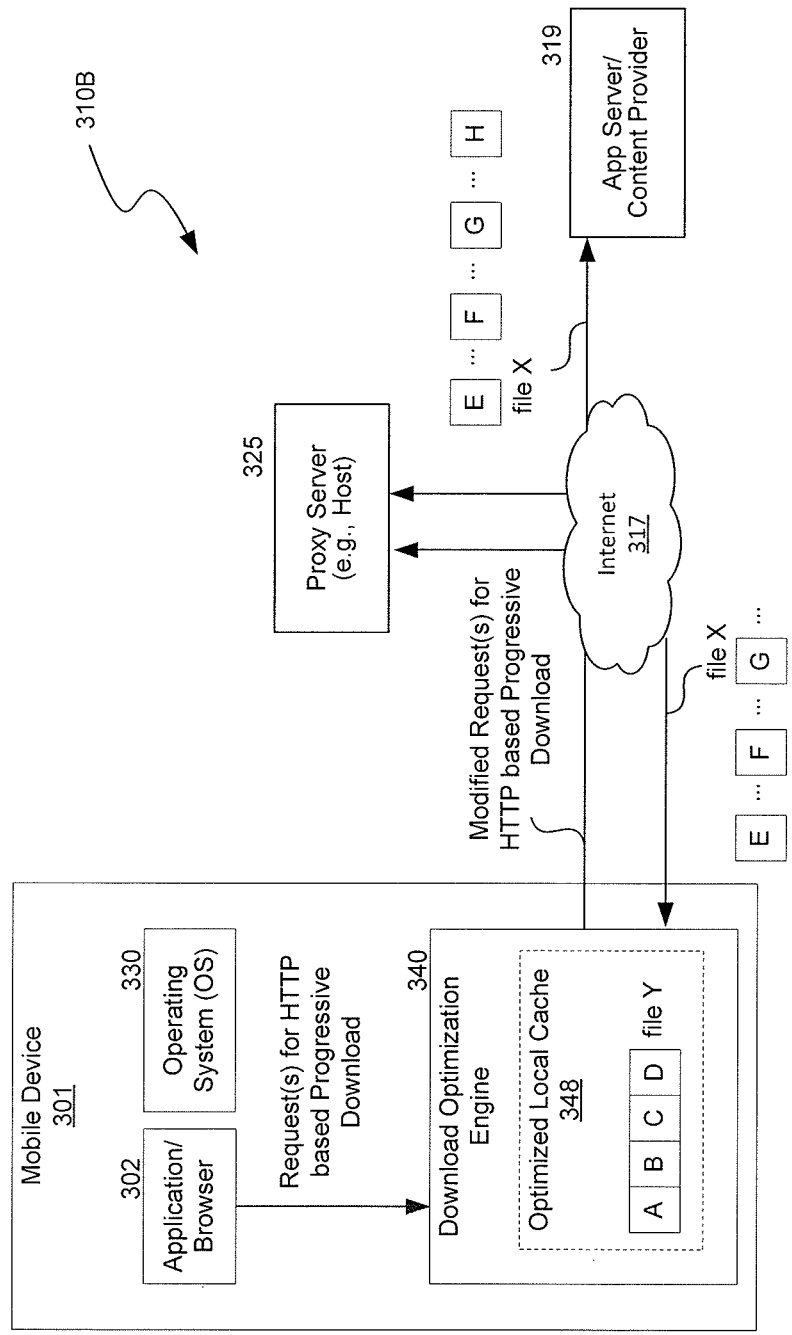
FIG. 3B depicts a diagram illustrating example resources, including a download optimization engine and a proxy/host server, that collectively implement the adaptive downloading and/or streaming optimization techniques disclosed herein.

FIG. 3B depicts a diagram 310B illustrating example resources, including a download optimization engine and a proxy/host server, that collectively implement the adaptive downloading and/or streaming optimization techniques disclosed herein. The example of FIG. 3B is similar to the example of FIG. 3A, however, the example of FIG. 3B includes a proxy server 325 that aids in the adaptive downloading technique by acting as a proxy for the mobile device. In this manner, file data can be ready cached at the proxy server 325 and processed and provided on-demand chunk by chunk with varying (adaptive) characteristics based on the corresponding request(s).

For example, the application/browser 302 sends an "HTTP based Progressive download" request to the download optimization engine 320 (which may be included as part of a client-proxy), and download optimization engine 320 sends a request over a network (e.g., Internet 317) for selective size downloads from the destined server (i.e., app server/content provider 319) to the proxy server 325 (e.g., host server). As discussed above, the proxy server 325 downloads all the necessary data and relay appropriately to the download optimization engine 320 in chunks (e.g., E, F, G . . . ).

In some embodiments, the proxy server 325 can optimize TCP signaling between the download optimization engine 320 and the proxy server 325. This optimization contributes in reducing end-to-end signaling resulting in reduced signaling, increased bandwidth, enhanced battery life of the mobile device, etc. Additionally, in some embodiments, various compression/decompression techniques can be utilized between the download optimization engine 320 and the proxy server 325 to further reduce end-end signaling.

Figure 4:
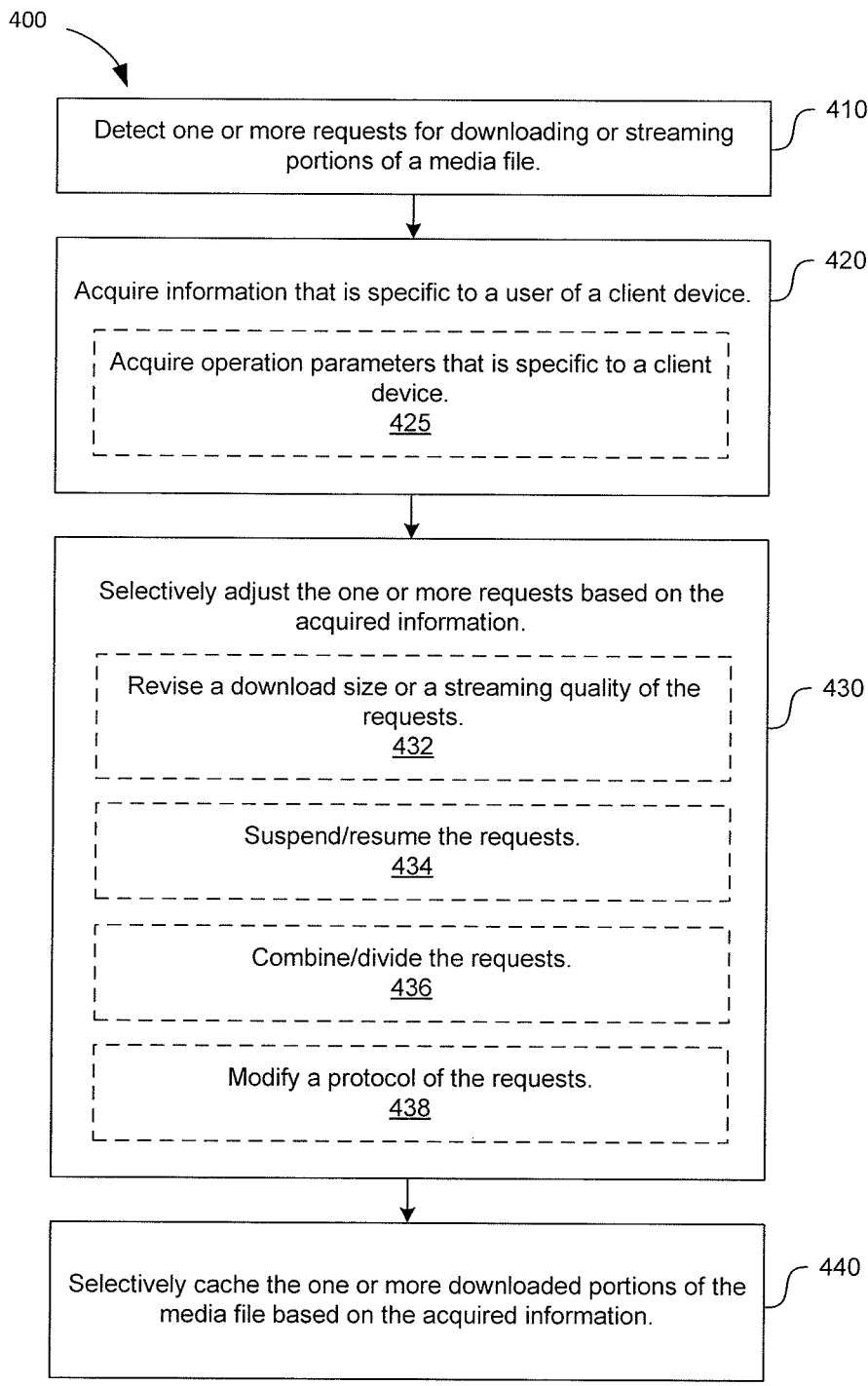
FIG. 4 depicts an example flow diagram illustrating a method of the adaptive progressive or selective-size downloading or streaming and/or content caching, all of which may be device-specific and/or user-specific.

FIG. 4 depicts an example flow diagram illustrating a method 400 of the adaptive media file download/streaming optimization and/or content caching. The method 400 can be implemented on, for example, a user mobile device (e.g., device 101, FIG. 1A; device 150, FIG. 1B; device 200, FIG. 2) or a local proxy (e.g., proxy 175, FIG. 1E). With general reference to FIGS. 1A-1B and 2-3, the method 400 is now described.

First, a download optimization engine (e.g., engine 105, FIG. 1A; engine 240, FIG. 2) employs a download detector (e.g., detector 242, FIG. 2) to detect the (410) requests for downloading or streaming one or more portions of content including a media file. The engine 105, 240 also employs an information module (e.g., module 107, FIG. 1A; module 244, FIG. 2) to acquire (420) information that is specific to a user of the mobile device 101, 150, 200. The user-specific information's acquisition can be performed using a user information module (e.g., module 244A, FIG. 2). In some embodiments, the information module 107, 244 can further acquire (425) operation parameters that is specific to the mobile device 101, 150, 200. The device/user specific information's acquisition can be performed using a device properties module (e.g., module 244B, FIG. 2).

Next, the engine 105, 240 selectively adjusts (430) the requests based on the acquired information by using an adjustment module (e.g., module 109, FIG. 1A; module 246, FIG. 2). In some embodiments, the adjustment module 109, 246 can revise (432) a download size or a streaming quality of the requests. In some embodiments, the adjustment module 109, 246 can suspend (434) and/or resume (434) the requests. In some embodiments, the adjustment module 109, 246 can combine (436) and/or divide (436) the requests. Additionally, in some embodiments, the adjustment module 109, 246 can modify (438) a protocol of the requests.

Then, in some embodiments, the optimization engine 105, 240 selectively caches (440) the one or more downloaded portions of the media file based on the acquired information.

Figure 5:
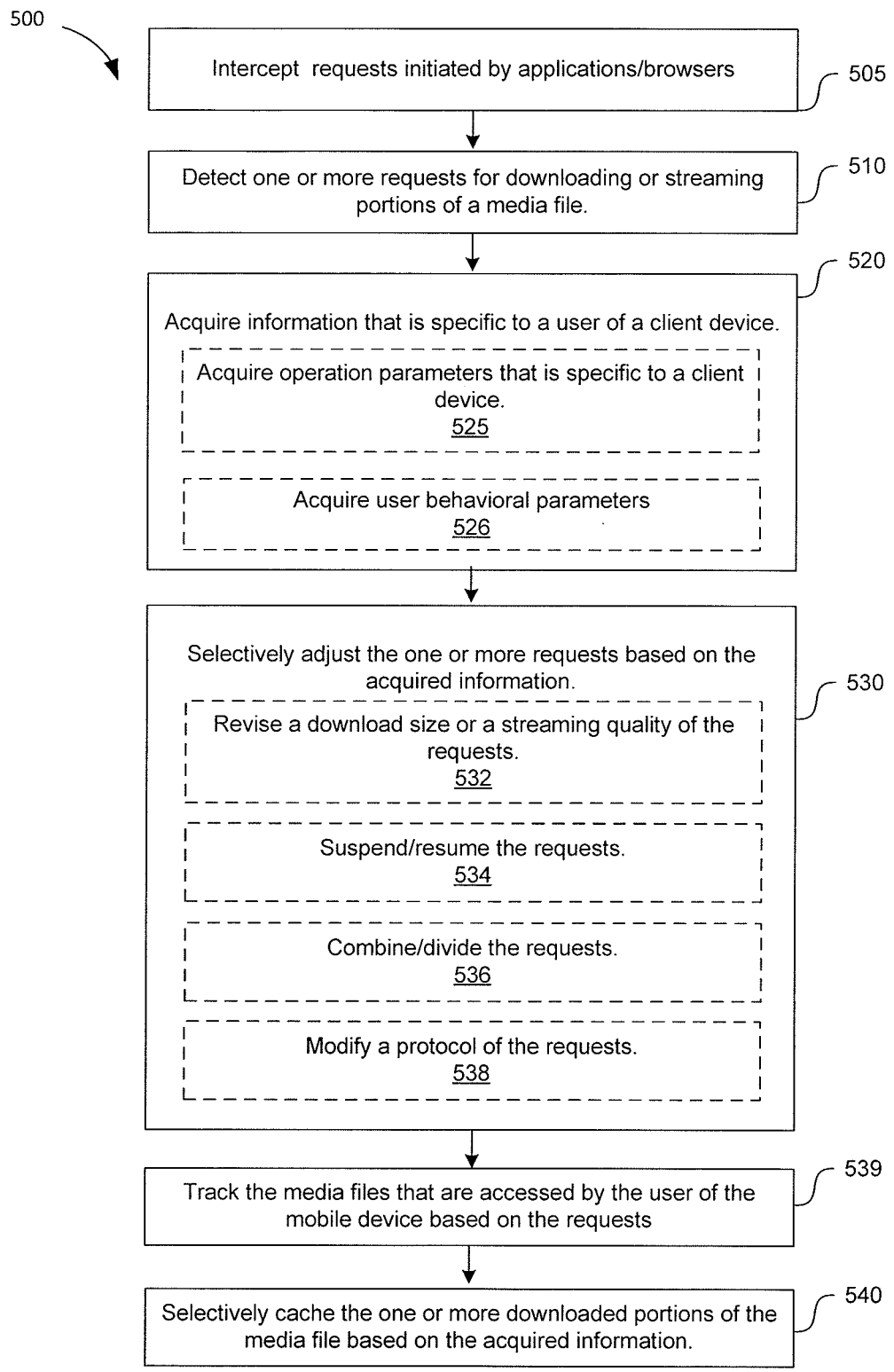
FIG. 5 depicts another example flow diagram illustrating a method of the adaptive progressive or selective-size downloading or streaming and/or content caching, all of which may be device-specific and/or user-specific.

FIG. 5 depicts an example flow diagram illustrating a method 500 of the adaptive media file download/streaming optimization and/or content caching. The method 500 can be implemented on, for example, a user mobile device (e.g., device 101, FIG. 1A; device 150, FIG. 1B; device 200, FIG. 2) or a local proxy (e.g., proxy 175, FIG. 1E). With general reference to FIGS. 1A-1B and 2-3, the method 500 is now described. Additionally, method 500 includes various steps that are the same or similar to method 400. These steps are noted and described in greater detail with reference to method 400.

First, a download optimization engine (e.g., engine 105, FIG. 1A; engine 240, FIG. 2) employs an interceptor module to intercept (505) requests initiated by applications and/or browsers executing on the mobile device. As described herein, a browser can also be considered an application. The engine 105, 240 also employs an information module (e.g., module 107, FIG. 1A; module 244, FIG. 2) to acquire (520) information that is specific to a user of the mobile device 101, 150, 200. The user-specific information's acquisition can be performed using a user information module (e.g., module 244A, FIG. 2).

The one or more request or data network requests can be any protocol request for real-time or progressive downloads. For example, the requests can be Hypertext Transfer Protocol (HTTP) requests, Real Time Messaging Protocol (RTMP) requests, Real-time Transport Protocol (RTP) requests, etc.

In some embodiments, the information module 107, 244 can further acquire (525) operation parameters that is specific to the mobile device 101, 150, 200. The device/user specific information's acquisition can be performed using a device properties module (e.g., module 244B, FIG. 2). In some embodiments, the information module 107, 244 can acquire (526) user behavioral parameters. The behavioral parameters can include behavior of the user of the mobile device with respect to the streaming media files. For example, the user behavior can be indicative of user behavior such as pausing, stopping, abandoning, etc., media files. In some embodiments, one or more Application Program Interface or system calls are generated to access and/or otherwise acquire the information specific to the mobile device or the user of the mobile device. In some embodiments, the acquired information can include real-time parameter such as, for example, current battery levels, selected user display preferences, etc. In some embodiments, the acquired information can include video/audio codec information, frame rates, mobile channel conditions, mobile signaling optimization settings/parameters, etc. In some embodiments, the engine 105, 240 makes use of hypertext transfer protocol (HTTP) messaging. For example, an HTTP 206 message is a partial content download message to download progressive videos and/or audio in chunks. This information can also be used by the engine as part of the detection step.

Next, the engine 105, 240 selectively adjusts or modifies (530) the requests based on the acquired information by using an adjustment module (e.g., module 109, FIG. 1A; module 246, FIG. 2). In some embodiments, one or more of the requests associated with downloading or streaming the media files are adaptively modified based on acquired information specific to the mobile device or a user of the mobile device. In some embodiments, the adjustment module 109, 246 can revise (532) a download size or a streaming quality of the requests. In some embodiments, the adjustment module 109, 246 can suspend (534) and/or resume (534) the requests. In some embodiments, the adjustment module 109, 246 can combine (536) and/or divide (536) the requests. Additionally, in some embodiments, the adjustment module 109, 246 can modify (538) a protocol of the requests.

As discussed, in some embodiments, the requests comprise data network requests initiated by mobile applications/browsers executing on the mobile device. Thus, the network traffic associated with (or generated by) the media files is adaptively modified as a result of the adaptive adjustment to the one or more data network requests. In some embodiment, the engine 105, 240 further transmits or directs transmission via a radio of the mobile device of the one or more modified data network requests to a content server (e.g., third-party server) to download or stream the media file. In some embodiments, each media file is downloaded or streamed to the mobile device in multiple chunks, and each chunk is received by the mobile device in response to a corresponding data network request. In some embodiments, each chunk has one or more chunk characteristics that are determined based on the corresponding data network request. For example, the chunk characteristics can include a download or display size that is adaptively selected based on the corresponding data network request, a streaming quality that is adaptively selected based on the corresponding data network request, etc.

In some embodiments, adaptively modifying the one or more data network requests reduces overall network traffic in the mobile network occurring as a result of the one or more data network requests.

In some embodiments, the optimization engine 105, 240 tracks (539) the media files that are accessed by the user of the mobile device based on the requests. For example, the engine can track the media files that are accessed by the user of the mobile device based on the data network requests, identify a subset of the media files that are accessed by the user of the mobile device most frequently, and (cache 540) cache the subset of the media files on the mobile device.

In some embodiments, the optimization engine 105, 240 selectively caches (540) the one or more downloaded portions of the media file based on the acquired information.

Figure 6:
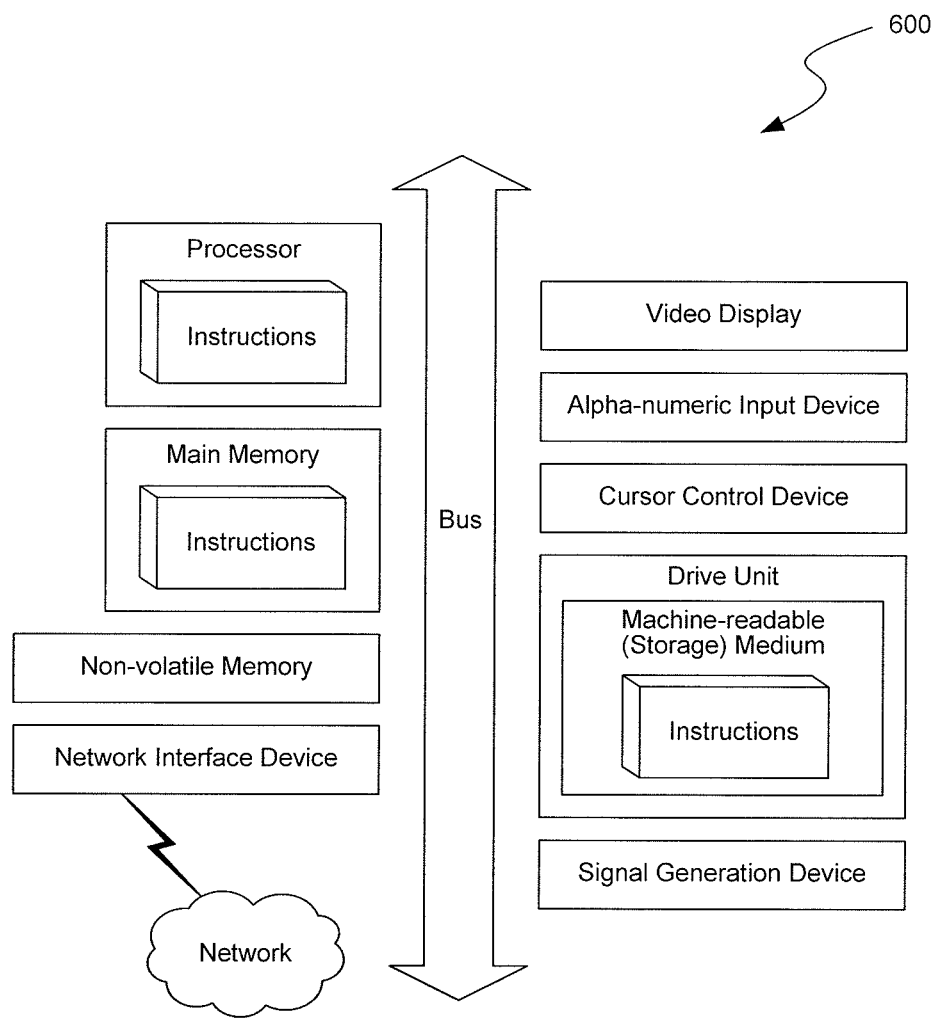
FIG. 6 depicts a diagrammatic representation of a machine in the example form of a computer system within which a set of instructions, for causing the machine to perform any one or more of the methodologies discussed herein, may be executed.

FIG. 6 shows a diagrammatic representation of a machine in the example form of a computer system within which a set of instructions, for causing the machine to perform any one or more of the methodologies discussed herein, may be executed.

In the example of FIG. 6, the computer system 600 includes a processor, memory, non-volatile memory, and an interface device. Various common components (e.g., cache memory) are omitted for illustrative simplicity. The computer system 600 is intended to illustrate a hardware device on which any of the components depicted in the example of FIG. 2 (and any other components described in this specification) can be implemented. The computer system 600 can be of any applicable known or convenient type. The components of the computer system 600 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic, RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 600. The non-volatile storage can be local, remote, or distributed. The non-volatile memory is optional because systems can be created with all applicable data available in memory. A typical computer system usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 8 reside in the interface.

In operation, the computer system 600 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in teens of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claim intended to be treated under 35 U.S.C. §112, ¶6 begins with the words "means for".) Accordingly, the applicant reserves the right to add additional claims after filing the application to pursue such additional claim forms for other aspects of the disclosure.

What is claimed is:

1. A method of adaptively adjusting downloaded or streamed network traffic in a mobile network, the method comprising:
    providing a mobile device including an optimization engine, the mobile device executing one or more applications;
    intercepting, by the optimization engine, data network requests to be transmitted from the mobile device to the mobile network, the data network requests initiated by the one or more mobile applications and intercepted before the data network requests are transmitted from the mobile device, wherein the intercepted data network requests include at least a header portion and a body portion, the header portion including at least a source and a destination network address;
    detecting, by the optimization engine, that one or more of the intercepted data network requests are associated with downloading or streaming media files;
    acquiring, by the optimization engine, user-specific information of a user of the mobile device, the user-specific information of a user of the mobile device being acquired separately from the one or more intercepted network requests;
    based on the acquired user-specific information, adaptively modifying, by the optimization engine, the detected data network requests that are associated with downloading or streaming the media files, wherein the adaptively modifying causes the downloading or streaming of the media files to be adjusted; and
    directing, by the optimization engine, the adaptively modified data network request to a content server corresponding to the destination network address via the mobile network.

2. The method of claim 1, wherein the network traffic associated with the media files is adaptively modified as a result of the adaptive adjustment to the one or more data network requests.

3. The method of claim 1, further comprising:
    transmitting, by the mobile device, the one or more modified data network requests to a content server to download or stream the media file,
    wherein each media file is downloaded or streamed to the mobile device in multiple chunks, and
    wherein each chunk is received by the mobile device in response to a corresponding data network request.

4. The method of claim 3, wherein each chunk has one or more chunk characteristics that are determined based on the corresponding data network request.

5. The method of claim 4, wherein at least one of the chunk characteristics comprises a download or display size that is adaptively selected based on the corresponding data network request.

6. The method of claim 4, wherein at least one of the chunk characteristics comprises a streaming quality that is adaptively selected based on the corresponding data network request.

7. The method of claim 1, further comprising acquiring the information specific to the mobile device or the user of the mobile device.

8. The method of claim 7, wherein acquiring the information comprises:
    generating one or more Application Program Interface or system calls to access the information specific to the mobile device or the user of the mobile device.

9. The method of claim 1, wherein the information specific to the mobile device or the user of the mobile device includes operational parameters specific to the mobile device.

10. The method of claim 1, wherein the information specific to the mobile device or the user of the mobile device includes real-time conditions specific to the mobile device.

11. The method of claim 1, wherein the information specific to the mobile device or the user of the mobile device includes behavior of the user of the mobile device with respect to the streaming media files.

12. The method of claim 1, wherein adaptively modifying the one or more data network requests reduces overall network traffic in the mobile network occurring as a result of the one or more data network requests.

13. The method of claim 1, further comprising:
tracking, by the optimization engine, the media files that are accessed by the user of the mobile device based on the data network requests;
identifying a subset of the media files that are accessed by the user of the mobile device, the subset comprising one or more of the media files that are most frequently accessed by the user of the mobile device;
caching the subset of the media files on the mobile device.

14. The method of claim 1 wherein one or more data network requests comprise a Hypertext Transfer Protocol (HTTP) request.

15. The method of claim 1 wherein one or more data network requests comprise a real-time protocol request.

16. The method of claim 1 wherein adaptively modifying the detected data network requests includes one of translating, converting, or adjusting the detected data network requests.

17. The method of claim 1 wherein adaptively modifying the detected data network requests includes adjusting a download size or a streaming quality of the requested media file.

18. The method of claim 1 wherein adaptively modifying the detected data network requests includes suspending or resuming the requests.

19. The method of claim 1 wherein adaptively modifying the detected data network requests includes combining a plurality of the detected data network requests into a single combined request.

20. The method of claim 1 wherein adaptively modifying the detected data network requests includes dividing at least one detected data network requests into a plurality of divided requests.

21. The method of claim 1 wherein adaptively modifying the detected data network requests includes converting a request to stream a first specified media file to a request to download the first specified media file.

22. The method of claim 1 wherein adaptively modifying the detected data network requests includes converting a request to download a second specified media file to a request to stream the second specified media file.

23. A method of adaptively modifying downloaded or streamed network traffic in a mobile network, the method comprising:
providing a mobile device including an optimization engine, the mobile device executing one or more applications;
intercepting, by the optimization engine, network signaling data network requests to be transmitted from the mobile device to the mobile network, the intercepted data network requests associated with downloading or streaming a media file,
wherein the network signaling is initiated by the one or more mobile applications and intercepted before the data network requests are transmitted from the mobile device, and
wherein the network signaling includes one or more data network requests, wherein the intercepted data network requests include at least a header portion and a body portion, the header portion including at least a source and a destination network address;
acquiring, by the optimization engine, information specific to the mobile device or the user of the mobile device, the user-specific information of a user of the mobile device being acquired separately from the one or more intercepted network requests;
based on the acquired information, adaptively modifying, by the optimization engine, the one or more data network requests associated with downloading or streaming the media files,
wherein the network traffic associated with the media files is adaptively adjusted as a result of the adaptively modifying the one or more data network requests;
wherein each media file is downloaded or streamed to the mobile device in multiple chunks and each chunk is received by the mobile device in response to a corresponding data network request;
wherein the adaptively modifying causes the downloading or streaming of the media files to be adjusted; and
directing, by the optimization engine, the adaptively modified data network request to a content server corresponding to the destination network address via the mobile network.

24. The method of claim 23, further comprising:
transmitting, by the mobile device, the one or more modified data network requests to a content server to download or stream the media file,
wherein each chunk has one or more chunk characteristics that are determined based on the corresponding data network request.

25. The method of claim 24, wherein at least one of the chunk characteristics comprises a download or display size that is adaptively selected based on the corresponding data network request or a streaming quality that is adaptively selected based on the corresponding data network request.

26. The method of claim 23, further comprising:
acquiring the information specific to the mobile device or the user of the mobile device,
wherein acquiring the information comprises generating one or more Application Program Interface or system calls to access the information specific to the mobile device or the user of the mobile device.

27. The method of claim 23, wherein the information specific to the mobile device or the user of the mobile device includes operational parameters specific to the mobile device, real-time conditions specific to the mobile device, or behavior of the user of the mobile device with respect to the streaming media files.

28. The method of claim 23, further comprising:
tracking, by the optimization engine, the media files that are accessed by the user of the mobile device based on the data network requests;
identifying a subset of the media files that are accessed by the user of the mobile device, the subset comprising one or more of the media files that are most frequently accessed by the user of the mobile device;
caching the subset of the media files on the mobile device.

29. The method of claim 1 wherein one or more data network requests comprise one or more of a Hypertext Transfer Protocol (HTTP) request or real-time protocol requests.

30. A mobile device comprising:
a radio;
one or more processors;
a memory unit storing instructions that when executed by the one or more processors, cause the mobile device to:
intercept data network requests to be transmitted from the mobile device to the mobile network, the data network requests initiated by mobile applications executing on the mobile device in the mobile network and intercepted before the data network requests are transmitted from the mobile device, wherein the data network requests include at least a header portion and a body portion, the header portion including at least a source and a destination network address;

detect that one or more of the intercepted data network requests are associated with downloading or streaming media files;

acquire user-specific information of a user of the mobile device, the user-specific information of a user of the mobile device being acquired separately from the one or more intercepted network requests;

adaptively modify the one or more of the data network requests that are associated with downloading or streaming the media files based on the acquired information, wherein the network traffic associated with the media files is adaptively modified as a result of the adaptive adjustment to the one or more data network requests, wherein the adaptively modifying causes the downloading or streaming of the media files to be adjusted; and directing, by the optimization engine, the adaptively modified data network request to a content server corresponding to the destination network address via the mobile network.

31. The mobile device of claim 30, wherein the instructions, when executed by the one or more processors, further cause the mobile device to:

direct the radio to transmit the one or more modified data network requests to a content server to download or stream the media file, wherein each media file is downloaded or streamed to the mobile device in multiple chunks, and wherein each chunk is received by the mobile device in response to a corresponding data network request.

32. The mobile device of claim 30, further comprising:

a cache memory system, wherein the instructions, when executed by the one or more processors, further cause the mobile device to cache a subset of the media files that are accessed most frequently by the user of the mobile device on the cache memory system.

33. The mobile device of claim 30, wherein at least one of the chunk characteristics comprises a download or display size that is adaptively selected based on the corresponding data network request or a streaming quality that is adaptively selected based on the corresponding data network request.

34. The mobile device of claim 30, wherein the instructions, when executed by the one or more processors, further cause the mobile device to:

acquire the information specific to the mobile device or the user of the mobile device, wherein acquiring the information comprises generating one or more Application Program Interface or system calls to access the information specific to the mobile device or the user of the mobile device.

35. The mobile device of claim 30, wherein the information specific to the mobile device or the user of the mobile device includes operational parameters specific to the mobile device, real-time conditions specific to the mobile device, or behavior of the user of the mobile device with respect to the streaming media files.

36. A non-transitory computer-readable storage medium storing instructions to be implemented by a mobile device having a processor, wherein the instructions, when executed by the processor, causes the mobile device to:

intercept data network requests initiated by mobile applications executing on the mobile device in the mobile network to be transmitted from the mobile device to the mobile network, the data network requests initiated by the one or more mobile applications and intercepted before the data network requests are transmitted from the mobile device, wherein the intercepted data network requests include at least a header portion and a body portion, the header portion including at least a source and a destination network address;

detect one or more of the intercepted data network requests that are associated with downloading or streaming media files;

adaptively modify the one or more of the data network requests that are associated with downloading or streaming the media files based on acquired information specific to the mobile device or a user of the mobile device, wherein the adaptively modifying causes the downloading or streaming of the media files to be adjusted, wherein the user-specific information of a user of the mobile device is acquired separately from the one or more intercepted network requests, wherein the network traffic associated with the media files is adaptively modified as a result of the adaptive adjustment to the one or more data network requests;

direct the radio to transmit the one or more adaptively modified data network requests to a content server corresponding to the destination network address via the mobile network to download or stream the media file, wherein each media file is downloaded or streamed to the mobile device in multiple chunks, and wherein each chunk is received by the mobile device in response to a corresponding data network request.

37. The non-transitory computer-readable storage medium of claim 36, wherein the instructions, when executed by the one or more processors, further cause the mobile device to cache a subset of the media files that are accessed most frequently by the user of the mobile device on a cache memory system.

* * * * *